United States Patent
Zhang et al.

(10) Patent No.: US 11,888,565 B2
(45) Date of Patent: Jan. 30, 2024

(54) METHOD FOR SENDING CHANNEL STATE INFORMATION AND RELATED DEVICE

(71) Applicant: HUAWEI TECHNOLOGIES CO., LTD., Guangdong (CN)

(72) Inventors: Di Zhang, Shenzhen (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 17/673,553

(22) Filed: Feb. 16, 2022

(65) Prior Publication Data
US 2022/0173782 A1 Jun. 2, 2022

Related U.S. Application Data

(63) Continuation of application No. PCT/CN2020/107488, filed on Aug. 6, 2020.

(30) Foreign Application Priority Data

Aug. 16, 2019 (CN) .......................... 201910760388.8

(51) Int. Cl.
*H04B 7/06* (2006.01)
*H04W 24/10* (2009.01)

(52) U.S. Cl.
CPC .......... *H04B 7/0626* (2013.01); *H04W 24/10* (2013.01)

(58) Field of Classification Search
CPC .. H04B 7/0645; H04B 7/0626; H04B 7/0874; H04B 7/0691; H04W 24/10
See application file for complete search history.

(56) References Cited

U.S. PATENT DOCUMENTS

2019/0132851 A1 5/2019 Davydov et al.
2019/0207722 A1 7/2019 Gao et al.
(Continued)

FOREIGN PATENT DOCUMENTS

CN 108288991 A 7/2018
CN 108833061 A 11/2018
(Continued)

OTHER PUBLICATIONS

Extended European Search Report issued in European Application No. 20853917.1 dated Sep. 7, 2022, 8 pages.
(Continued)

*Primary Examiner* — Jaison Joseph
(74) *Attorney, Agent, or Firm* — Fish & Richardson P.C.

(57) ABSTRACT

This application provides example methods and example devices for sending channel state information. One example method includes receiving L reference signals, where L is a positive integer greater than or equal to 1. Channel state information can then be sent, where the channel state information includes resource indexes of M reference signals in the L reference signals, K pieces of antenna panel state information, and M sets of channel quality information, where the K pieces of antenna panel state information indicate states of antenna panels, the K pieces of antenna panel state information are related to M sets of channel quality information, the M sets of channel quality information are in a one-to-one correspondence with the resource indexes of the M reference signals.

20 Claims, 5 Drawing Sheets

(56) References Cited

U.S. PATENT DOCUMENTS

| | | | |
|---|---|---|---|
| 2019/0254110 A1 | 8/2019 | He et al. | |
| 2020/0029274 A1* | 1/2020 | Cheng | H04W 76/28 |
| 2021/0143870 A1* | 5/2021 | Faxér | H04B 7/0626 |
| 2021/0184742 A1* | 6/2021 | Gao | H04L 25/0226 |
| 2021/0351825 A1* | 11/2021 | Zhang | H04L 5/0053 |
| 2022/0140878 A1* | 5/2022 | Zhu | H04B 7/088 370/252 |
| 2022/0166484 A1* | 5/2022 | Go | H04W 72/046 |
| 2022/0173782 A1* | 6/2022 | Zhang | H04B 7/0645 |
| 2022/0330160 A1* | 10/2022 | Hwang | H04B 7/06 |
| 2023/0087391 A1* | 3/2023 | Elshafie | H04L 5/0057 370/329 |

FOREIGN PATENT DOCUMENTS

| | | |
|---|---|---|
| CN | 108886799 A | 11/2018 |
| EP | 3493422 A1 | 6/2019 |
| WO | 2018058456 A1 | 4/2018 |
| WO | 2018230975 A1 | 12/2018 |

OTHER PUBLICATIONS

Vivo, "Further Discussion on Multi-Beam Operation," 3GPP TSG RAN WG1 #97, R1-1906160, Reno, USA, May 13-17, 2019, 9 pages.

Lenovo, Motorola Mobility, "Discussion of multi-beam operation," 3GPP TSG RAN WG1 #96bis, R1-19004573, Xi'an, China, Apr. 8-12, 2019, 6 pages.

Office Action issued in Chinese Application No. 201910760388.8 dated Feb. 23, 2022, 6 pages (with English translation).

Office Action issued in Chinese Application No. 201910760388.8 dated Sep. 16, 2021, 16 pages (with English translation).

PCT International Search Report and Written Opinion issued in International Application No. PCT/CN2020/107488 dated Oct. 28, 2020, 14 pages (with English translation).

\* cited by examiner

METHOD FOR SENDING CHANNEL STATE INFORMATION AND RELATED DEVICE

CROSS-REFERENCE TO RELATED APPLICATIONS

This application is a continuation of International Application No. PCT/CN2020/107488, filed on Aug. 6, 2020, which claims priority to Chinese Patent Application No. 201910760388.8, filed on Aug. 16, 2019. The disclosures of the aforementioned applications are hereby incorporated by reference in their entireties.

TECHNICAL FIELD

This application relates to the field of communications technologies, and more specifically, to a method for sending channel state information and a related device.

BACKGROUND

In a communication process between a terminal device and a network device, the network device sends a reference signal to the terminal device. The terminal device may measure the reference signal to obtain channel quality information, and send the channel quality information to the network device.

One terminal device may have a plurality of antenna panels (panels). One antenna panel may correspond to one or more beams. The plurality of antenna panels of the terminal device may not all be in an active state. In other words, a quantity of antenna panels in the active state in the terminal device is not fixed. Consequently, a length of feedback information that is sent by the terminal device to the network device and that is used to feedback channel quality information is not fixed. Correspondingly, the network device does not know the length of the feedback information. The network device may determine the feedback information only through blind detection. This greatly increases implementation complexity of the network device.

SUMMARY

This application provides a method for sending channel state information and a related device, so that a network device can obtain channel quality information reported by a terminal device.

According to a first aspect, an embodiment of this application provides a method for sending channel state information. The method includes: receiving L reference signals, where L is a positive integer greater than or equal to 1; and sending channel state information, where the channel state information includes resource indexes of M reference signals, K pieces of antenna panel state information, and M sets of channel quality information, where the M reference signals belong to the L reference signals; the K pieces of antenna panel state information indicate states of antenna panels; the K pieces of antenna panel state information are related to the M sets of channel quality information; the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

Based on the foregoing technical solution, a terminal device notifies a network device of a quantity and a length of sent channel quality information. In this way, implementation complexity of obtaining the channel quality information by the network device can be reduced, and load of the network device can be reduced.

With reference to the first aspect, in a possible implementation of the first aspect, the states of the antenna panels include a first state or a second state; and the first state is a state in which transmission can be performed, and the second state is a state in which transmission cannot be performed; the first state is an active state, and the second state is an inactive state; the first state is an enabled state, and the second state is a disabled state; or the first state is a power-on state, and the second state is a power-off state.

With reference to the first aspect, in a possible implementation of the first aspect, that the K pieces of antenna panel state information are related to the M sets of channel quality information includes: a $j^{th}$ piece of antenna panel state information in the K pieces of antenna panel state information corresponds to at least one set of channel quality information in the M sets of channel quality information, and j is an integer greater than or equal to 1 and less than or equal to K.

Based on the foregoing technical solution, the terminal device may notify the network device of a quantity of sets of sent channel quality information, so that the network device determines a quantity and a length of received channel quality information.

With reference to the first aspect, in a possible implementation of the first aspect, the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information includes $P_j$ pieces of channel quality information, the $P_j$ pieces of channel quality information are in a one-to-one correspondence with the $P_j$ antenna panels, and i is a positive integer greater than or equal to 1 and less than or equal to M.

Based on the foregoing technical solution, the terminal device may notify the network device of a quantity of channel quality information included in each set of channel quality information, so that the network device determines a quantity and a length of received channel quality information.

With reference to the first aspect, in a possible implementation of the first aspect, one of the K pieces of antenna panel state information indicates that states of a maximum of $P_{max}$ antenna panels are the first state, and a value of $P_{max}$ is configured by the network device.

Based on the foregoing technical solution, the terminal device may determine, based on an indication of the network device, a maximum quantity of reported channel quality information. In this way, the network device can manage the quantity of channel quality information reported by the terminal device.

With reference to the first aspect, in a possible implementation of the first aspect, channel quality information in the M sets of channel quality information indicates that no measurement is performed on a corresponding antenna panel, or indicates channel quality of a corresponding antenna panel that is obtained through measurement.

In the foregoing technical solution, the terminal device may indicate, by using the channel quality information, an antenna panel on which no reference signal is measured. In this way, the network device may configure reference signals used to measure these antenna panels, to obtain more accurate scheduling information.

With reference to the first aspect, in a possible implementation of the first aspect, one piece of channel quality information in the M sets of channel quality information indicates that no measurement is performed on a corresponding antenna panel; and in channel quality information in the M sets of channel quality information, an antenna panel corresponding to channel quality information of a preset value is not measured.

With reference to the first aspect, in a possible implementation of the first aspect, the preset value is a minimum state value of the channel quality information.

With reference to the first aspect, in a possible implementation of the first aspect, the channel state information includes a first part of information and a second part of information, and the first part of information and the second part of information are independently encoded; and the first part of information includes the resource indexes of the M reference signals, the K pieces of antenna panel state information, and M pieces of channel quality information, the second part of information includes channel quality information other than the channel quality information included in the first part of information in the M sets of channel quality information, and the M pieces of channel quality information respectively belong to the M sets of channel quality information; or the first part of information includes the resource indexes of the M reference signals and the K pieces of antenna panel state information, and the second part of information includes the M sets of channel quality information.

In the foregoing technical solution, because the first part of information and the second part of information are independently encoded, the network device may first decode an encoding result of the first part of information, to determine a length of the encoded second part of information. In this way, the network device can decode the encoded second part of information.

With reference to the first aspect, in a possible implementation of the first aspect, channel quality indicated by the M sets of channel quality information is greater than or equal to a preset threshold.

According to a second aspect, an embodiment of this application provides a method for sending channel state information. The method includes: sending L reference signals, where L is a positive integer greater than or equal to 1; receiving channel state information, where the channel state information includes resource indexes of M reference signals, K pieces of antenna panel information, and M sets of channel quality information; and determining the M sets of channel quality information based on the K pieces of antenna panel information, where the M reference signals belong to the L reference signals; the K pieces of antenna panel state information indicate states of antenna panels; the K pieces of antenna panel state information are related to the M sets of channel quality information; the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

Based on the foregoing technical solution, a network device may determine, based on antenna panel state information sent by a terminal device, a quantity and a length of channel quality information sent by the terminal device. In this way, implementation complexity of obtaining the channel quality information by the network device can be reduced, and load of the network device can be reduced.

With reference to the second aspect, in a possible implementation of the second aspect, the states of the antenna panels include a first state or a second state; and the first state is a state in which transmission can be performed, and the second state is a state in which transmission cannot be performed; the first state is an active state, and the second state is an inactive state; the first state is an enabled state, and the second state is a disabled state; or the first state is a power-on state, and the second state is a power-off state.

With reference to the second aspect, in a possible implementation of the second aspect, that the K pieces of antenna panel state information are related to the M sets of channel quality information includes: a $j^{th}$ piece of antenna panel state information in the K pieces of antenna panel state information corresponds to at least one set of channel quality information in the M sets of channel quality information, and j is an integer greater than or equal to 1 and less than or equal to K.

Based on the foregoing technical solution, the network device may determine, based on a correspondence between antenna panel state information and a set of channel quality information, a quantity of sets of channel quality information corresponding to each piece of antenna panel state information, to further determine a quantity of channel quality information included in each set of channel quality information.

With reference to the second aspect, in a possible implementation of the second aspect, the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information includes $P_j$ pieces of channel quality information, the $P_j$ pieces of channel quality information are in a one-to-one correspondence with the $P_j$ antenna panels, and i is a positive integer greater than or equal to 1 and less than or equal to M.

Based on the foregoing technical solution, the network device may determine, based on one piece of antenna panel information, a quantity of channel quality information in each of one or more sets of channel quality information corresponding to the antenna panel information, to determine a total quantity of channel quality information reported by the terminal device.

With reference to the second aspect, in a possible implementation of the second aspect, one of the K pieces of antenna panel state information indicates that states of a maximum of $P_{max}$ antenna panels are the first state, and a value of $P_{max}$ is configured by the network device.

Based on the foregoing technical solution, the terminal device may determine, based on an indication of the network device, a maximum quantity of reported channel quality information. In this way, the network device can manage the quantity of channel quality information reported by the terminal device.

With reference to the second aspect, in a possible implementation of the second aspect, channel quality information in the M sets of channel quality information indicates that no measurement is performed on a corresponding antenna panel, or indicates channel quality of a corresponding antenna panel that is obtained through measurement.

In the foregoing technical solution, the terminal device may indicate, by using the channel quality information, an antenna panel on which no reference signal is measured. In this way, the network device may configure reference signals used to measure these antenna panels, to obtain more accurate scheduling information.

With reference to the second aspect, in a possible implementation of the second aspect, one piece of channel quality information in the M sets of channel quality information indicates that no measurement is performed on a corresponding antenna panel; and in channel quality information in the M sets of channel quality information, an antenna panel corresponding to channel quality information of a preset value is not measured.

With reference to the second aspect, in a possible implementation of the second aspect, the preset value is a minimum state value of the channel quality information.

With reference to the second aspect, in a possible implementation of the second aspect, the channel state information includes a first part of information and a second part of information, and the first part of information and the second part of information are independently encoded; and the first part of information includes the resource indexes of the M reference signals, the K pieces of antenna panel state information, and M pieces of channel quality information, the second part of information includes channel quality information other than the channel quality information included in the first part of information in the M sets of channel quality information, and the M pieces of channel quality information respectively belong to the M sets of channel quality information; or the first part of information includes the resource indexes of the M reference signals and the K pieces of antenna panel state information, and the second part of information includes the M sets of channel quality information.

In the foregoing technical solution, because the first part of information and the second part of information are independently encoded, the network device may first decode an encoding result of the first part of information, to determine a length of the encoded second part of information. In this way, the network device can decode the encoded second part of information.

With reference to the second aspect, in a possible implementation of the second aspect, channel quality indicated by the M sets of channel quality information is greater than or equal to a preset threshold.

According to a third aspect, an embodiment of this application provides a method for sending a reference signal measurement result. The method includes: receiving a reference signal; and sending antenna panel indication information and feedback information, where the antenna panel indication information indicates N antenna panels or states of the N antenna panels, the feedback information indicates that the reference signal is not measured on the N antenna panels, and N is a positive integer greater than or equal to 1.

In the foregoing technical solution, a terminal device may indicate an antenna panel on which no reference signal is measured. In this way, the network device may configure reference signals used to measure these antenna panels, to obtain more accurate scheduling information.

With reference to the third aspect, in a possible implementation of the third aspect, the feedback information includes N pieces of channel quality information, the N pieces of channel quality information are in a one-to-one correspondence with the N antenna panels, and values of the N pieces of channel quality information are a preset value; or the feedback information includes one piece of channel quality information, the channel quality information corresponds to the N antenna panels, and a value of the channel quality information is a preset value.

In the foregoing technical solution, the terminal device may indicate, by using the channel quality information, an antenna panel on which no reference signal is measured. In this way, no new channel signaling needs to be added to indicate the antenna panel on which no reference signal is measured, so that minor modifications are made to an existing system.

With reference to the third aspect, in a possible implementation of the third aspect, the preset value is a minimum state value of the channel quality information.

With reference to the third aspect, in a possible implementation of the third aspect, the states of the N antenna panels are a state in which transmission can be performed.

According to a fourth aspect, an embodiment of this application provides a method for sending a reference signal measurement result. The method includes: sending a reference signal; and receiving antenna panel indication information and feedback information, where the antenna panel indication information indicates N antenna panels or states of the N antenna panels, and the feedback information indicates that the reference signal is not measured on the N antenna panels.

In the foregoing technical solution, the terminal device may indicate an antenna panel on which no reference signal is measured. In this way, the network device may configure reference signals used to measure these antenna panels, to obtain more accurate scheduling information.

With reference to the fourth aspect, in a possible implementation of the fourth aspect, the feedback information includes N pieces of channel quality information, the N pieces of channel quality information are in a one-to-one correspondence with the N antenna panels, and values of the N pieces of channel quality information are a preset value; or the feedback information includes one piece of channel quality information, the channel quality information corresponds to the N antenna panels, and a value of the channel quality information is the preset value.

In the foregoing technical solution, the terminal device may indicate, by using the channel quality information, an antenna panel on which no reference signal is measured. In this way, no new channel signaling needs to be added to indicate the antenna panel on which no reference signal is measured, so that minor modifications are made to an existing system.

With reference to the fourth aspect, in a possible implementation of the fourth aspect, the preset value is a minimum state value of the channel quality information.

With reference to the fourth aspect, in a possible implementation of the fourth aspect, the states of the N antenna panels are a state in which transmission can be performed.

According to a fifth aspect, an embodiment of this application provides a communications apparatus. The communications apparatus includes units configured to implement any one of the first aspect or the possible implementations of the first aspect.

According to a sixth aspect, an embodiment of this application provides a communications apparatus. The communications apparatus includes units configured to implement any one of the second aspect or the possible implementations of the second aspect.

According to a seventh aspect, an embodiment of this application provides a communications apparatus. The communications apparatus includes units configured to implement any one of the third aspect or the possible implementations of the third aspect.

According to an eighth aspect, an embodiment of this application provides a communications apparatus. The communications apparatus includes units configured to implement any one of the fourth aspect or the possible implementations of the second aspect.

According to a ninth aspect, an embodiment of this application provides a terminal device, including a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the method design in the first aspect.

According to a tenth aspect, an embodiment of this application provides a network device, including a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the method design in the second aspect.

According to an eleventh aspect, an embodiment of this application provides a terminal device, including a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the method design in the third aspect.

According to a twelfth aspect, an embodiment of this application provides a network device, including a transceiver and a processor. Optionally, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the method design in the fourth aspect.

According to a thirteenth aspect, an embodiment of this application provides a communications system. The system includes the terminal device according to the ninth aspect and the network device according to the tenth aspect.

According to a fourteenth aspect, an embodiment of this application provides a communications system. The system includes the terminal device according to the eleventh aspect and the network device according to the twelfth aspect.

According to a fifteenth aspect, an embodiment of this application provides a communications apparatus. The communications apparatus may be the terminal device in the method design in the first aspect or a chip disposed in the terminal device. The communications apparatus includes a processor that is coupled to a memory, and the processor may be configured to execute instructions in the memory, to implement the method performed by the terminal device in any one of the possible implementations of the method design in the first aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a sixteenth aspect, an embodiment of this application provides a communications apparatus. The communications apparatus may be the network device in the method design in the second aspect or a chip disposed in the network device. The communications apparatus includes a processor that is coupled to a memory, and the processor may be configured to execute instructions in the memory, to implement the method performed by the network device in any one of the possible implementations of the method design in the second aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a seventeenth aspect, an embodiment of this application provides a communications apparatus. The communications apparatus may be the terminal device in the method design in the third aspect or a chip disposed in the terminal device. The communications apparatus includes a processor that is coupled to a memory, and the processor may be configured to execute instructions in the memory, to implement the method performed by the terminal device in any one of the possible implementations of the method design in the third aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to an eighteenth aspect, an embodiment of this application provides a communications apparatus. The communications apparatus may be the network device in the method design in the fourth aspect or a chip disposed in the network device. The communications apparatus includes a processor that is coupled to a memory, and the processor may be configured to execute instructions in the memory, to implement the method performed by the network device in any one of the possible implementations of the method design in the fourth aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a nineteenth aspect, an embodiment of this application provides a computer program product. The computer program product includes computer program code, and when the computer program code is run on a computer, the computer is enabled to perform the method according to the first aspect.

According to a twentieth aspect, an embodiment of this application provides a computer program product. The computer program product includes computer program code, and when the computer program code is run on a computer, the computer is enabled to perform the method according to the second aspect.

According to a twenty-first aspect, an embodiment of this application provides a computer program product. The computer program product includes computer program code, and when the computer program code is run on a computer, the computer is enabled to perform the method according to the third aspect.

According to a twenty-second aspect, a computer program product is provided. The computer program product includes computer program code, and when the computer program code is run on a computer, the computer is enabled to perform the method according to the fourth aspect.

According to a twenty-third aspect, an embodiment of this application provides a computer-readable medium. The computer-readable medium stores program code, and when the computer program code is run on a computer, the computer is enabled to perform the method according to the first aspect.

According to a twenty-fourth aspect, an embodiment of this application provides a computer-readable medium. The computer-readable medium stores program code, and when the computer program code is run on a computer, the computer is enabled to perform the method according to the second aspect.

According to a twenty-fifth aspect, an embodiment of this application provides a computer-readable medium. The computer-readable medium stores program code, and when the computer program code is run on a computer, the computer is enabled to perform the method according to the third aspect.

According to a twenty-sixth aspect, an embodiment of this application provides a computer-readable medium. The computer-readable medium stores program code, and when the computer program code is run on a computer, the computer is enabled to perform the method according to the fourth aspect.

DESCRIPTION OF EMBODIMENTS

The following describes the technical solutions in this application with reference to the accompanying drawings.

The technical solutions in the embodiments of this application may be applied to various communications systems, for example, a future fifth generation (5th generation, 5G) system or a new radio (new radio, NR) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), and a worldwide interoperability for microwave access (worldwide interoperability for microwave access, WiMAX) communications system. The technical solutions in the embodiments of this application may be further applied to device-to-device (device to device, D2D) communication, machine-to-machine (machine to machine, M2M) communication, machine type communication (machine type communication, MTC), and communication in an internet-of-vehicles system. Communication modes in the internet of vehicles system are collectively referred to as V2X (X represents everything). For example, V2X communication includes vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

To facilitate understanding of the embodiments of this application, a communications system to which the embodiments of this application are applicable is first described in detail with reference to FIG. 1.

Figure 1:
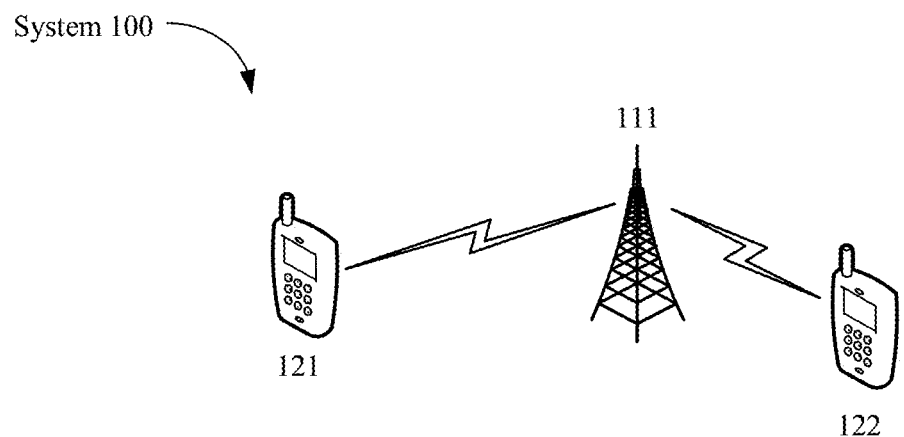
FIG. 1 is a schematic diagram of a wireless communications system 100 to which embodiments of this application are applicable.

FIG. 1 is a schematic diagram of a wireless communications system 100 to which embodiments of this application are applicable. As shown in FIG. 1, the wireless communications system 100 may include a network device 111, a terminal device 121, and a terminal device 122. A plurality of antennas may be configured for each of the network device and the terminal device. The network device and the terminal device may communicate with each other by using a multi-antenna technology.

The communications system 100 may be in a single-carrier scenario or a carrier aggregation (carrier aggregation, CA) scenario. In the communications system 100, the network device and the terminal device communicate with each other by using a wireless network. It should be understood that the communications system to which the embodiments of this application are applied is merely an example for description, and the communications system to which the embodiments of this application are applicable is not limited thereto.

It should be further understood that the communications system may further include more or fewer network devices, or the communications system may further include more or fewer terminal devices.

The terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, a terminal device having a wireless transceiver function and a chip that can be disposed in the foregoing terminal device are collectively referred to as a terminal device.

By way of example and not limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

For example, the terminal device may include a radio resource control (radio resource control, RRC) signaling exchange module, a media access control (media access control, MAC) signaling exchange module, and a physical (physical, PHY) signaling exchange module. The RRC signaling exchange module may be a module used by the network device and the terminal device to send and receive RRC signaling. The MAC signaling exchange module may be a module used by the network device and the terminal device to send and receive media access control control element (media access control control element, MAC-CE) signaling. The PHY signaling exchange module may be a module used by the network device and the terminal device to send and receive uplink control signaling or downlink control signaling, uplink and downlink data, or downlink data.

The network device in the embodiments of this application may be a device configured to communicate with the terminal device or a chip in the device. The network device may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay station, an access point, a vehicle-mounted device, a wearable device, a network device in a future 5G network, a network device in a future evolved PLMN network, or the like. This is not limited in the embodiments of this application.

For example, the network device may also include an RRC signaling exchange module, a MAC signaling exchange module, and a PHY signaling exchange module.

In some deployments, the network device may include a centralized unit (centralized unit, CU) and a distributed unit (distributed unit, DU). The network device may further include an active antenna unit (active antenna unit, AAU for short). The CU implements some functions of the network device, and the DU implements some functions of the network device. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

For ease of understanding of the embodiments of this application, several terms used in this application are first briefly described.

1. Beam

The beam in an NR protocol may be embodied as a spatial domain filter (spatial filter), which is also referred to as a spatial filter (spatial filter) or a spatial parameter (spatial parameter). A beam used to send a signal may be referred to as a transmit beam (transmission beam, Tx beam), or may be referred to as a spatial transmit filter (spatial domain transmit filter) or a spatial transmit parameter (spatial domain transmit parameter). A beam used to receive a signal may be referred to as a receive beam (reception beam, Rx beam), or may be referred to as a spatial receive filter (spatial domain receive filter) or a spatial receive parameter (spatial domain receive parameter).

The beam may correspond to a time resource, a space resource, and/or a frequency domain resource.

Optionally, the beam may further correspond to a reference signal resource (for example, a reference signal resource for beamforming) or beamforming information.

Optionally, the beam may further correspond to information associated with a reference signal resource of the network device. A reference signal may be a channel state information reference signal (channel state information reference signal, CSI-RS), an SSB, a demodulation reference signal (demodulation reference signal, DMRS), a phase tracking signal (phase tracking reference signal, PTRS), a tracking signal (tracking reference signal, TRS), or the like. The information associated with the reference signal resource may be a reference signal resource identifier, quasi-co-location (quasi-co-location, QCL) information (especially QCL type D), or the like. The reference signal resource identifier corresponds to a transmit-receive beam pair that is previously established during measurement performed based on the reference signal resource. The terminal may infer beam information by using a resource index of the reference signal.

It may be understood that the resource index of the reference signal indicates a time-frequency resource position of the reference signal. The time-frequency resource position of the reference signal in the communications system may be configured by the network device, and the resource position may be represented by using the resource index.

A transmit beam may be signal strength distribution formed in different directions in space after a signal is transmitted by an antenna, and a receive beam may be signal strength distribution in different directions in space of a radio signal received from an antenna.

It should be understood that the foregoing listed representation of the beam in the NR protocol is merely an example, and shall not constitute any limitation on this application. This application does not exclude a possibility of defining another term in a future protocol to represent a same or similar meaning.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like Different beams may be considered as different resources. Same information or different information may be transmitted by using different beams.

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as one antenna port set.

2. Beam Pairing Relationship

The beam pairing relationship is a pairing relationship between a transmit beam and a receive beam, that is, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal through beam sweeping, and the receive end may also receive the reference signal through beam sweeping. Specifically, the transmit end may form different directional beams in space through beamforming, and may perform polling on a plurality of different directional beams, to transmit a reference signal by using the different directional beams, so that power of transmitting the reference signal can reach a maximum value in a direction directed by a transmit beam. The receive end may also form different directional beams in space through beamforming, and may perform polling on a plurality of different directional beams, to receive a reference signal by using the different directional beams, so that power of receiving the reference signal by the receive end can reach a maximum value in a direction directed by a receive beam.

Each transmit beam and receive beam are traversed, so that the receive end may perform channel measurement based on the received reference signal, and report, by using channel state information (channel state information, CSI) to the transmit end, a result obtained through measurement. For example, the receive end may report, to the transmit end, some reference signal resources with larger reference signal received power (reference signal receiving power, RSRP), for example, report an identifier of the reference signal resource, so that the transmit end sends and receives a signal based on a beam pairing relationship with better channel quality during data or signaling transmission.

3. Antenna Port (Antenna Port)

The antenna port may also be referred to as a port for short. The antenna port is a transmit antenna identified by a receive end device or a transmit antenna that can be distinguished in space. One antenna port may be configured for each virtual antenna, each virtual antenna may be a weighted combination of a plurality of physical antennas, and each antenna port may correspond to one reference signal port.

4. Antenna Panel

At least one antenna panel may be disposed on each of the network device and the terminal device. One antenna panel may correspond to one set of independent transmit links, for example, including a power amplifier and a transmit channel. One antenna panel may further correspond to one set of independent receive links, for example, including a power amplifier and a receive channel. An antenna panel used to send a signal and an antenna panel used to receive a signal may be a same antenna panel, or may be different antenna panels. One antenna panel may generate a plurality of analog beams by using a phase shifter. However, due to a working principle of the phase shifter, analog beams generated by a same antenna panel cannot be used at the same time, that is, a plurality of analog beams generated by one antenna panel can only be time division multiplexed, and independent analog beams generated by a plurality of antenna panels may be used at the same time, that is, a plurality of analog beams generated by the plurality of antenna panels can be frequency division multiplexed. A plurality of physical antennas in one antenna panel may further generate digital beams (for example, precoders (precoders) or precoding matrices). The digital beams may be frequency division multiplexed, space division multiplexed, or the like. In other words, an antenna panel including a plurality of antennas may support multi-layer data transmission. A plurality of layers of data may be transmitted by using one orthogonal precoding matrix. The plurality of layers of data may be further superposed on analog beams at a high frequency for transmission (that is, the data is transmitted in a hybrid manner by using a digital beam and an analog beam).

The antenna panel may be one or more physical antennas on the terminal device. The antenna panel (panel) may also be referred to as an antenna set, a radio transceiver unit (transceiver unit, TXRU) (or referred to as a radio transceiver set), an antenna unit, an antenna group, a horizontal antenna set, a vertical antenna set, an antenna element, an antenna port set, or the like. The antenna panel may alternatively have another name. The embodiments of this application are not limited thereto.

It should be further understood that, in the embodiments of this application, the "antenna panel" may be replaced with "antenna panel information", that is, the antenna panel may be represented by using the antenna panel information. The antenna panel information may be a virtual identifier of the antenna panel, an identifier that implicitly indicates a reference signal resource of the antenna panel, an antenna port group identifier (UE antenna port group ID), an antenna group identifier (UE antenna group ID), a beam group identifier, a reference signal resource group identifier, or an antenna panel identifier. This is not limited in this application. It should be understood that, the antenna panel information in the embodiments of this application may be replaced with virtual identification information of the antenna panel, identification information that implicitly indicates a reference signal resource of the antenna panel, antenna port group identification information, antenna group identification information, beam group identification information, reference signal resource group identification information, or antenna panel identification information. The antenna panel information may also be referred to as another term. The embodiments of this application are not limited thereto.

It should be understood that, one piece of antenna panel information may correspond to one power control parameter and/or one timing advance (Timing advance, TA) parameter. It should be understood that, the antenna panel in the present invention may be a transmit antenna panel, or may be receive antenna panel information. Optionally, the terminal device and the network device may determine one or more antenna panels, antenna port groups, or antenna groups based on one antenna panel.

It should be noted that, with continuous development of technologies, the terms in the embodiments of this application may change, but all of them shall fall within the protection scope of this application.

5. Quasi-Co-Location (Quasi-Co-Location, QCL)

Quasi-co-location or quasi-colocation: Signals corresponding to antenna ports that have a QCL relationship have a same parameter or similar parameters, a parameter of one antenna port may be used to determine a parameter of another antenna port that has a QCL relationship with the antenna port, two antenna ports have a same parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial receive parameter (spatial Rx parameter). The spatial receive parameter may include one or more of the following: an angle of arrival (angle of arrival, AOA), an average AOA, an AOA spread, an angle of departure (angle of departure, AOD), an average angle of departure AOD, an AOD spread, a receive antenna spatial correlation parameter, a transmit antenna spatial correlation parameter, a transmit beam, a receive beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different time points, on different frequencies, or on different code domain resources, or antenna ports that have different antenna port numbers and that are used to send or receive information at different time points, on different frequencies, or on different code domain resources. The resource identifier may include a CSI-RS resource indicator, an SRS resource identifier, an SSB resource identifier, a resource identifier of a preamble sequence transmitted on a physical random access channel (Physical Random Access Channel, PRACH), or a resource identifier of a demodulation reference signal (demodulation reference signal, DMRS), used to indicate a beam on a resource.

In an NR protocol, the QCL relationship may be classified into the following four types based on different parameters:

Type A (type A): Doppler shift, Doppler spread, average delay, and delay spread;

Type B (type B): Doppler shift and Doppler spread;

Type C (type C): Doppler shift and average delay; and

Type D (type D): spatial receive parameter.

A QCL type used in the embodiments of this application is not limited.

Using Type D as an example, when the QCL relationship is a QCL relationship of Type D, the QCL relationship may be considered as spatial QCL. When the antenna ports satisfy the spatial QCL relationship, a QCL relationship between ports for downlink signals or between ports for uplink signals may be that the two signals have a same AOA or AOD, and indicates that the two signals have a same receive beam or transmit beam. For another example, a QCL relationship between a downlink signal and an uplink signal or between a port for an uplink signal and a port for a downlink signal may be a correspondence between AOAs and AODs of the two signals, or a correspondence between AODs and AOAs of the two signals. To be specific, beam reciprocity may be used to determine an uplink transmit beam based on a downlink receive beam or determine a downlink receive beam based on an uplink transmit beam.

From a perspective of the transmit end, if two antenna ports are spatially QCLed, it may mean that corresponding beam directions of the two antenna ports are consistent in space. From a perspective of the receive end, if two antenna ports are spatially QCLed, it may mean that the receive end can receive, in a same beam direction, signals sent by using the two antenna ports.

Signals transmitted on ports having a spatial QCL relationship may further have corresponding beams. The corresponding beams include at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may alternatively be understood as signals received or sent by using a same spatial filter (spatial filter). The spatial filter may be at least one of the following: precoding, a weight of an antenna port, a phase deflection of the antenna port, or an amplitude gain of the antenna port.

Signals transmitted on ports having a spatial QCL relationship may alternatively be understood as having corresponding beam pair links (beam pair links, BPLs). The corresponding BPLs include at least one of the following: a same downlink BPL, a same uplink BPL, an uplink BPL corresponding to a downlink BPL, or a downlink BPL corresponding to an uplink BPL.

Therefore, the spatial receive parameter (namely, QCL Type D) may be understood as a parameter used to indicate direction information of a receive beam.

6. Transmission Configuration Indicator (Transmission Configuration Indicator, TCI)-State (State) (TCI-State)

The TCI-state may be used to indicate a QCL relationship between two reference signals. Each TCI-state may include a serving cell index (ServeCellIndex), a bandwidth part (bandwidth part, BWP) identifier (identifier, ID), and a reference signal resource identifier. The reference signal resource identifier may be, for example, at least one of the following: a non-zero-power (non-zero power, NZP) CSI-RS reference signal resource identifier (NZP-CSI-RS-ResourceId), a non-zero-power CSI-RS reference signal resource set identifier (NZP-CSI-RS-ResourceSetId), an SSB index (SSB-Index), a sounding reference signal resource identifier (SRI), or a sounding reference signal resource set identifier.

In a subsequent communication process, the terminal device may determine a receive beam based on a TCI-state indicated by the network device, and the network device may determine a transmit beam based on the same TCI-state.

In addition, the TCI-state may be globally configured. In TCI-states configured for different cells and different BWPs, if indexes of the TCI-states are the same, configurations of the corresponding TCI-states are also the same.

7. Precoding

In some systems such as an OFDM system, a precoding (precoding) technology may be used to improve multi-stream transmission performance, implement beamforming, and so on. A conventional means for implementing precoding includes multiplying a precoding matrix (precoding matrix) before a signal is sent. One row or one column of the precoding matrix may be referred to as a precoding vector. Based on different implementation methods and implementation objectives, a precoding matrix may be multiplied by a signal on a baseband. This implementation means is generally referred to as digital precoding. Alternatively, the precoding matrix may directly act on a signal at a radio frequency antenna end. This implementation means is generally referred to as analog precoding.

When a channel state is known, the network device may process a to-be-sent signal by using a precoding matrix that matches a channel resource, so that a precoded to-be-sent signal adapts to the channel, to reduce complexity of eliminating inter-channel interference by a receive device. Therefore, after the to-be-sent signal is precoded, quality (for example, a signal to interference plus noise ratio (signal to interference plus noise ratio, SINR)) of a received signal is improved.

The beamforming technology may be a digital beamforming technology, an analog beamforming technology, a hybrid digital/analog beamforming technology, or the like. The precoding vector may include a digital precoding vector, an analog precoding vector, a hybrid precoding vector, or the like.

Figure 2:
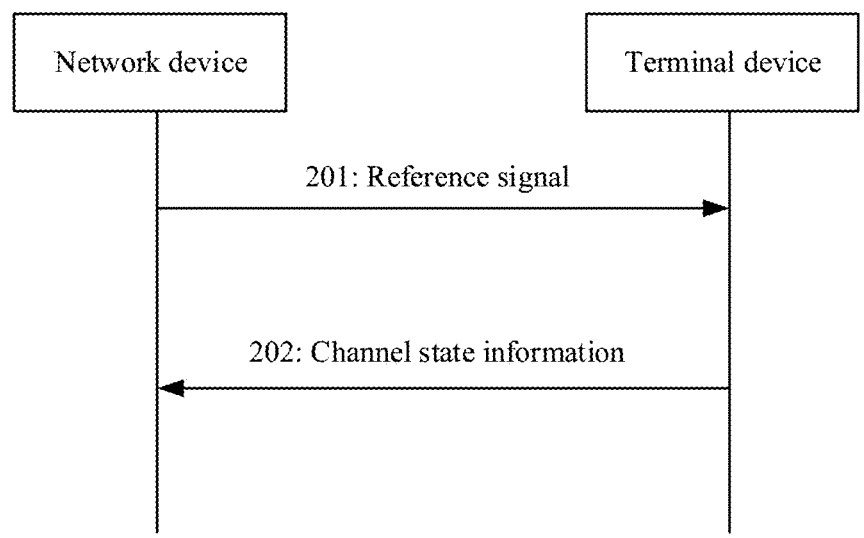
FIG. 2 shows a method for sending channel state information according to an embodiment of this application.

FIG. 2 shows a method for sending channel state information according to an embodiment of this application. The method may include the following steps.

201: A network device sends L reference signals (reference signals) to a terminal device, where L is a positive integer greater than or equal to 1. Correspondingly, the terminal device may receive the L reference signals from the network device.

202: The terminal device sends channel state information to the network device, where the channel state information may include resource indexes of M reference signals, K pieces of antenna panel state information, and M sets of channel quality information. Correspondingly, the network device receives the channel state information from the terminal device.

Table 1 shows an example of a structure of the channel state information.

TABLE 1

| Channel state information reporting number | Channel state information field |
| --- | --- |
| Channel state information number #n | Resource index of a first reference signal |
| | Resource index of a second reference signal |
| | Antenna panel state information 1 |
| | Antenna panel state information 2 |
| | Channel quality information #1-1 |
| | Channel quality information #1-2 |
| | Channel quality information #2-1 |
| | Channel quality information #2-2 |

As shown in Table 1, the channel state information reported by the terminal device includes resource indexes of two reference signals, two pieces of antenna panel state information, and two sets of channel quality information. Each of the two sets of channel quality information includes two pieces of channel quality information. The $1^{st}$ set of channel quality information includes the channel quality information #1-1 and the channel quality information #1-2, and the $2^{nd}$ set of channel quality information includes the channel quality information #2-1 and the channel quality information #2-2.

The channel quality information #1-1 represents channel quality information of an antenna panel 1 in the terminal device that is obtained by measuring the first reference signal.

In some embodiments, the channel quality information #1-2 represents channel quality information of an antenna panel 2 in the terminal device that is obtained by measuring the first reference signal. The channel quality information #2-1 represents channel quality information of the antenna panel 1 in the terminal device that is obtained by measuring the second reference signal. The channel quality information #2-2 represents channel quality information of the antenna panel 2 in the terminal device that is obtained by measuring the second reference signal.

In some other embodiments, the channel quality information #1-2 may be a difference between channel quality information of the antenna panel 2 that is obtained by measuring the first reference signal and channel quality information of the antenna panel 1 that is obtained by measuring the first reference signal, or an absolute value of the difference. The channel quality information #2-1 may be a difference between channel quality information of the antenna panel 1 that is obtained by measuring the second reference signal and channel quality information of the antenna panel 1 that is obtained by measuring the first reference signal, or an absolute value of the difference. The channel quality information #2-2 may be a difference between channel quality information of the antenna panel 2 that is obtained by measuring the second reference signal and channel quality information of the antenna panel 1 that is obtained by measuring the first reference signal, or an absolute value of the difference.

The resource indexes of the M reference signals, the K pieces of antenna panel state information, and the M sets of channel quality information in the channel state information are separately described below.

1. The Resource Indexes of the M Reference Signals

The M reference signals belong to the L reference signals. Therefore, M is a positive integer greater than or equal to 1 and less than or equal to L. The resource indexes of the M reference signals are in a one-to-one correspondence with the M sets of channel quality information.

For example, a resource index of the $1^{st}$ reference signal in the resource indexes of the M reference signals corresponds to the $1^{st}$ set of channel quality information in the M sets of channel quality information, a resource index of the $2^{nd}$ reference signal corresponds to the $2^{nd}$ set of channel quality information, a resource index of the $3^{rd}$ reference signal corresponds to the $3^{rd}$ set of channel quality information, and so on.

After receiving the L reference signals, the terminal device may determine one or more reference signals with better quality (for example, reference signal received power (Reference Signal Receiving Power, RSRP) is greater than a preset threshold), and send resource indexes of these reference signals to the network device. The M reference signals may be reference signals with better quality that are determined by the terminal device.

It should be understood that, in this embodiment of this application, the reference signal may be a channel state information reference signal (Channel State Information Reference Signal, CSI-RS), a demodulation reference signal (demodulation reference signal, DMRS), a phase tracking signal (phase tracking reference signal, PTRS), a tracking signal (tracking reference signal, TRS), a synchronization signal and physical broadcast channel block (synchronization signal/PBCH block, SSB), or the like. The resource index of the reference signal may be a CSI-RS resource indicator (CSI-RS resource indicator, CRI) or an SSB resource indicator (SSB Resource Indicator, SSBRI). The SSBRI may also be referred to as an SSB index (SSB index).

2. The K Pieces of Antenna Panel State Information

K is an integer greater than or equal to 0. The antenna panel state information indicates states of antenna panels. The states of the antenna panels may include a first state or a second state.

In some embodiments, K is a positive integer greater than or equal to 0 and less than or equal to M.

In a possible implementation, the antenna panel state information may indicate an antenna panel whose state is the first state and an antenna panel whose state is the second state. In other words, the state of the antenna panel indicated by the antenna panel state information may include the first state or the second state.

In another possible implementation, the antenna panel state information may indicate only an antenna panel whose state is the first state. In other words, all states of antenna panels indicated by the antenna panel state information are the first state.

In another possible implementation, the antenna panel state information may indicate only an antenna panel whose state is the second state. In other words, all states of antenna panels indicated by the antenna panel state information are the second state.

The first state may be a state in which the antenna panel is ready for transmission, and the network device may schedule, with a low delay (or even no delay), the antenna panel in the first state to transmit a signal/channel. The first state may be referred to as an active state, an enabled state, a power-on state, a state in which transmission can be performed, or the like.

The second state may be a state in which the antenna panel is not ready for transmission, and the network device cannot schedule, with a low delay (or even no delay), the antenna panel in the second state to transmit an uplink signal/channel. For example, the second state may be referred to as an inactive state, a disabled state, a power-off state, or a state in which transmission cannot be performed.

It should be understood that a value of K may be configured by the network device, may be reported by the terminal device, or may be predefined in a protocol. For example, the value of K may be reported by the terminal device by using the channel state information, or may be reported by using information other than the channel state information. For example, when the state of the antenna panel of the terminal device does not change, the terminal device may report that a quantity of antenna panel state information is 0 in the channel state information. When the state of the antenna panel of the terminal device does not change, the terminal device may report that a quantity of antenna panel state information is a fixed value or another value in the channel state information.

The state of the antenna panel indicated by the antenna panel state information may be the same as or different from a state of the antenna panel when the terminal device sends the channel state information. It may also be understood that effective time of the state of the antenna panel indicated by the antenna panel state information may be that the state of the antenna panel has taken effect when the channel state information is sent or the state of the antenna panel takes effect after the channel state information is sent. The following describes the two implementations.

In a possible implementation, the state of the antenna panel indicated by the antenna panel state information may be different from the state of the antenna panel when the terminal device sends the channel state information. In other words, the state of the antenna panel indicated by the antenna panel state information takes effect after the channel state information is sent. Specifically, there may be the following several cases with reference to the state of the antenna panel indicated by the antenna panel state information:

Case 1: A state of the antenna panel whose state is indicated by the antenna panel state information as the first state may be the second state at a current moment (which is a moment at which the terminal device sends the channel state information to the network device). However, after the terminal device sends the channel state information, the state of the antenna panel may be switched to the first state. In other words, the effective time of the state of the antenna panel indicated by the antenna panel state information may be later than time at which the terminal device sends the antenna panel state information.

For example, it is assumed that the moment at which the terminal device sends the channel state information is $t_1$, the antenna panel state information in the channel state information indicates the first state of one antenna panel, a state of the antenna panel at the moment $t_1$ is the second state, but the antenna panel is in the first state at a moment $t_2$. The moment $t_2$ is later than the moment $t_1$. Optionally, an interval $\Delta t_{12}$ between the moment $t_1$ and the moment $t_2$ may be a preset value. For example, $\Delta t_{12}$ may be 2 ms, 1 ms, or 3 ms.

Case 2: A state of the antenna panel whose state is indicated by the antenna panel state information as the second state may be the first state at a current moment. However, after the terminal device sends the channel state information, the state of the antenna panel may be switched to the second state.

For example, it is assumed that the moment at which the terminal device sends the channel state information is $t_1$, the antenna panel state information in the channel state information indicates the second state of one antenna panel, a state of the antenna panel at the moment $t_1$ is the first state, but the antenna panel is in the second state at a moment $t_3$. The moment $t_3$ is later than the moment $t_1$. Optionally, $t_3$ may be the same as $t_2$ or may be different from $t_2$. This is not limited in this embodiment of this application. Optionally, an interval $\Delta t_{13}$ between the moment $t_1$ and the moment $t_3$ may be a preset value. For example, $\Delta t_{13}$ may be 2 ms, 1 ms, or 3 ms.

In another possible implementation, the state of the antenna panel indicated by the antenna panel state information may be the same as the state of the antenna panel when the terminal device sends the channel state information. In other words, the state of the antenna panel indicated by the antenna panel state information has taken effect when the channel state information is sent (that is, the antenna panel is already in the state indicated by the antenna panel state information). Specifically, there may be the following several cases with reference to different states of the antenna panel indicated by the antenna panel state information:

Case 1: A state of the antenna panel whose state is indicated by the antenna panel state information as the first state may be the first state at a current moment (that is, a moment at which the antenna panel state information is sent). The terminal device does not change the state of the antenna panel in the first state.

Case 2: A state of the antenna panel whose state is indicated by the antenna panel state information as the second state may be the second state at a current moment. The terminal device does not change the state of the antenna panel in the second state.

For example, it is assumed that the moment at which the terminal device sends the channel state information is $t_1$, the antenna panel state information in the channel state information indicates the second state of one antenna panel, and a state of the antenna panel is the second state at the moment $t_1$. Alternatively, it is assumed that the moment at which the terminal device sends the channel state information is $t_1$, the antenna panel state information in the channel state information indicates the first state of one antenna panel, and a state of the antenna panel is the first state at the moment $t_1$.

In another possible implementation, the antenna panel state information may indicate states of a plurality of antenna panels. The states of the plurality of antenna panels indicated by the antenna panel state information may be completely the same as, or partially the same as, or completely different from states of the antenna panels when the terminal device sends the channel state information. That is, the states of the plurality of antenna panels indicated by the antenna panel state information have all taken effect when the channel state information is sent (that is, the antenna panels are already in the states indicated by the antenna panel state information), or partially take effect, or all take effect after the channel state information is sent. Specifically, there may be the following several cases with reference to different states of the plurality of antenna panels indicated by the antenna panel state information:

Case 1: States of the plurality of antenna panels in the first state indicated by the antenna panel state information may be the same at a current moment (that is, a moment at which the antenna panel state information is sent) (for example, the states are all the first state or the second state), or may be different (for example, some of the states are the first state and the other states are the second state).

For example, it is assumed that the antenna panel state information indicates that states of the antenna panel 1 and an antenna panel 4 in the terminal device are the first state. A state of the antenna panel 1 at the current moment may be the first state, and a state of the antenna panel 4 at the current moment may be the second state. In this case, after sending the channel state information, the terminal device needs to switch the state of the antenna panel 4 to the first state.

For another example, the antenna panel state information indicates that states of the antenna panel 1 and an antenna panel 4 are the first state. A state of the antenna panel 1 at the current moment may be the first state, and a state of the antenna panel 4 at the current moment may also be the first state. In this case, after sending the channel state information, the terminal device does not need to switch the states of the antenna panels 1 and 4.

For another example, the antenna panel state information indicates that states of the antenna panel 1 and an antenna panel 4 are the first state. A state of the antenna panel 1 at the current moment may be the second state, and an actual state of the antenna panel 4 at the current moment may also be the second state. In this case, after sending the channel state information, the terminal device needs to switch the states of the antenna panel 1 and the antenna panel 4 to the first state.

Case 2: States of the plurality of antenna panels in the second state indicated by the antenna panel state information at a current moment may be the same (for example, the states are all the first state) or may be different (for example, some of the states are the first state and the other states are the second state).

For example, it is assumed that the antenna panel state information indicates that states of the antenna panel 2 and an antenna panel 3 in the terminal device are the second state. A state of the antenna panel 2 at the current moment may be the second state, and a state of the antenna panel 3 at the current moment may be the first state. Therefore, after sending the channel state information, the terminal device needs to switch the state of the antenna panel 3 to the second state.

For another example, the antenna panel state information indicates that states of the antenna panel 2 and an antenna panel 3 are the second state. A state of the antenna panel 2 at the current moment may be the first state, and an actual state of the antenna panel 3 at the current moment may also be the first state. In this case, after sending the channel state information, the terminal device needs to switch the states of the antenna panel 2 and the antenna panel 3 to the second state.

For another example, the antenna panel state information indicates that states of the antenna panel 2 and an antenna panel 3 are the second state. A state of the antenna panel 2 at the current moment may be the second state, and an actual state of the antenna panel 3 at the current moment may also be the second state. In this case, after sending the channel state information, the terminal device does not need to switch the states of the antenna panel 2 and the antenna panel 3.

It should be understood that the antenna panel state information may further indicate some antenna panels in the first state and some antenna panels in the second state, and effective time of the antenna panels may be various combinations of state effective time of antenna panels. Details are not described herein.

It should be understood that the "current moment" may be a moment at which the antenna panel state information is sent.

Optionally, that the antenna panel state information indicates the state of the antenna panel may be understood as that the antenna panel state information indicates at least one antenna panel and a state of the at least one antenna panel. The at least one antenna panel is in a one-to-one correspondence with the state of the at least one antenna panel.

For example, assuming that a state of one antenna panel is the first state, and an antenna panel corresponding to the state of the antenna panel is the antenna panel 1, the state of the antenna panel is the state of the antenna panel 1.

In a possible implementation, the antenna panel state information may include only state information of at least one antenna panel. For example, the antenna panel state information may indicate states of P antenna panels by using a bitmap (bitmap, which may also be referred to as a bitmap). A length of the bitmap may be the same as a quantity of antenna panels, each bit in the bitmap may correspond to one antenna panel, and a value of the bit may be used to indicate a state of the corresponding antenna panel.

States of any two antenna panels in the at least one antenna panel may be the same or may be different. In other words, the antenna panel state information may indicate an antenna panel whose state is the first state, and may also indicate an antenna panel whose state is the second state.

In another possible implementation, the antenna panel state information may include only information about at least one antenna panel (for example, an identifier of the antenna panel). A state of the at least one antenna panel is the same. In other words, the antenna panel state information may be used to indicate only antenna panels in a same state. For example, when the antenna panel state information indicates a state of an antenna panel by using a state value, one piece of antenna panel state information may include one or more state values. One state value may include s bits, one state value may be used to indicate an identifier of one antenna panel, and antenna panels indicated by the antenna panel state information are all in the first state.

In another possible implementation, the antenna panel state information may include only information about at least one antenna panel (for example, an identifier of the antenna panel). A state of the at least one antenna panel may be different. That the antenna panel state information indicates the state of the antenna panel may be understood as that some state bits of the antenna panel state information indicate an antenna panel in the first state, and the other state bits of the antenna panel state information indicate an antenna panel in the second state. For example, when the antenna panel state information indicates a state of an antenna panel by using a state value, one piece of antenna panel state information may include a plurality of state values, and the state value indicates information about the antenna panel (for example, an identifier of the antenna panel). States of antenna panels indicated by some state values are the first state, and states of antenna panels indicated by the other state values are the second state.

In another possible implementation, the antenna panel state information may include information about at least one antenna panel (for example, an identifier of the antenna panel) and state information corresponding to the information about the at least one antenna panel. For example, some state bits of the antenna panel state information indicate the information about the antenna panel, and the other state bits indicate a state corresponding to the antenna panel state information.

Optionally, there may be the following several implementations for the quantity of antenna panels indicated by the antenna panel state information:

Implementation 1: The quantity of antenna panels indicated by the antenna panel state information may be a total quantity of antenna panels included in the terminal device. For example, the terminal device has a total of P antenna panels. The P antenna panels may be P transmit antenna panels or P receive antenna panels, or a total quantity of transmit antenna panels and receive antenna panels is P. P is a positive integer greater than or equal to 1.

Implementation 2: The quantity of antenna panels indicated by the antenna panel state information may be a quantity of antenna panels that is reported by using a terminal device capability parameter. For example, P antenna panels are reported by using a terminal device capability. The P antenna panels may be P transmit antenna panels or P receive antenna panels, or a total quantity of transmit antenna panels and receive antenna panels is P. P is a positive integer greater than or equal to 1.

Implementation 3: The quantity of antenna panels indicated by the antenna panel state information may be sent by the terminal device to the network device. For example, the channel state information may include information (which may be referred to as antenna panel quantity information) used to indicate the quantity of antenna panels. Alternatively, the antenna panel quantity information may be sent to the network device by using information other than the channel state information.

Implementation 4: The quantity of antenna panels indicated by the antenna panel state information may be indicated by the network device to the terminal device by using indication information (which may also be understood as that the terminal device determines, based on the indication information of the network device, a quantity of antenna panel information indicated by the antenna panel state information of the terminal device).

Implementation 5: The quantity of antenna panels indicated by the antenna panel state information may be predefined in a protocol.

For example, a $j^{th}$ piece of antenna panel state information in the K pieces of antenna panel state information may indicate that states of $P_j$ antenna panels in the P antenna panels are the first state, P is a positive integer greater than or equal to 1, and $P_j$ is a positive integer greater than or equal to 1 and less than or equal to P. For example, the $1^{st}$ piece of antenna panel state information in the K pieces of antenna panel state information indicates that states of $P_1$ antenna panels in the P antenna panels are the first state, the $2^{nd}$ piece of antenna panel state information indicates that states of $P_2$ antenna panels in the P antenna panels are the first state, . . . , and a $K^{th}$ piece of antenna panel state information indicates that states of $P_K$ antenna panels in the P antenna panels are the first state.

If a value of $P_j$ is less than P, states of antenna panels (that is, $P-P_j$ antenna panels) other than the $P_j$ antenna panels whose states are the first state in the P antenna panels are not in the first state. For example, the states of the antenna panels other than the $P_j$ antenna panels whose states are the first state are all the second state. For example, the $1^{st}$ piece of antenna panel state information in the K pieces of antenna panel state information indicates that the states of the $P_1$ antenna panels in the P antenna panels are the first state and states of $P-P_1$ antenna panels are the second state, the $2^{nd}$ piece of antenna panel state information indicates that the states of the $P_2$ antenna panels in the P antenna panels are the first state and states of $P-P_2$ antenna panels are the second state, . . . , and the $j^{th}$ piece of antenna panel state information in the K pieces of antenna panel state information indicates that the states of the $P_K$ antenna panels in the P antenna panels are the first state and states of $P-P_K$ antenna panels are the second state. In this case, the $j^{th}$ piece of antenna panel state information may further indicate that the states of the $P-P_j$ antenna panels in the P antenna panels are the second state.

If the value of $P_j$ is equal to P, the $P_j$ antenna panels in the first state indicated by the $j^{th}$ antenna panel state information are all antenna panels of the terminal device.

For example, the antenna panel state information may include a sequence number of an antenna panel whose state is the first state (or information such as an identifier that may be used to identify an antenna panel). For example, it is assumed that the terminal device includes four antenna panels, which are respectively the antenna panel 1, the antenna panel 2, the antenna panel 3, and the antenna panel 4. If states of the antenna panel 1 and the antenna panel 4 are the first state, the antenna panel state information may include 001 (that is, 1 in binary representation) and 100 (that is, 4 in binary representation). Alternatively, in some other embodiments, the antenna panel state information may include a sequence number of an antenna panel whose state is the second state (or information such as an identifier that may be used to identify an antenna panel). In this case, the network device may determine, based on the sequence number of the antenna panel in the second state, an antenna panel in the first state in the terminal device.

Optionally, the antenna panel state information may indicate the state of the antenna panel by using a bitmap (bitmap, which may also be referred to as a bitmap), or may indicate the state of the antenna panel by using a state value. The following describes the two implementations.

In a possible implementation, the antenna panel state information may indicate the states of the P antenna panels by using a bitmap. A length of the bitmap may be the same as a quantity of antenna panels, each bit in the bitmap may correspond to one antenna panel, and a value of the bit may be used to indicate a state of the corresponding antenna panel.

In an example, if the terminal device includes the P antenna panels, the antenna panel state information may be a bitmap whose length is P. A state of an antenna panel corresponding to a bit whose bit value is 1 in the bitmap is the first state, and a state of an antenna panel corresponding to a bit whose bit value is 0 is the second state. The P antenna panels are in a one-to-one correspondence with P bits in the bitmap. The P antenna panels in the terminal device may be sorted in sequence. For example, the P antenna panels may be respectively the antenna panel 1, the antenna panel 2, the antenna panel 3, . . . , and an antenna panel P. In this case, the $1^{st}$ bit in the P bits may correspond to the antenna panel 1, the $2^{nd}$ bit may correspond to the antenna panel 2, the $3^{rd}$ bit may correspond to the antenna panel 3, and so on.

For example, assuming that a value of P is 4, the antenna panel state information may be a bitmap whose length is 4 bits. Assuming that the 4-bit bitmap is 1001, it indicates that the states of the antenna panel 1 and the antenna panel 4 in the terminal device are the first state, and the states of the antenna panel 2 and the antenna panel 3 are the second state.

It can be learned that the bitmap may not only indicate the state of the antenna panel, but also indicate a specific antenna panel in the state of the antenna panel. In other words, the bitmap may indicate a state of at least one antenna panel, and may also indicate an identifier of the at least one antenna panel.

In another implementation, the antenna panel state information may indicate states of the P antenna panels by using state values. One piece of antenna panel state information may include one or more state values. One state value may include s bits, one state value may be used to indicate a state of one antenna panel, and s is a positive integer greater than or equal to 1. In other words, in this case, one state value indicates a state of one antenna panel.

Specifically, there may be the following several cases with reference to a type of the state indicated by the antenna panel state information:

Case 1: The states of the antenna panels indicated by the antenna panel state information are all the first state.

For example, it is assumed that the terminal device has a total of four antenna panels (a panel #1, a panel #2, a panel #3, and a panel #4), and a value of P is 2. One antenna panel may be indicated by using 2 bits (for example, the panel #1 is indicated by 00, the panel #2 is indicated by 01, the panel #3 is indicated by 10, and the panel #4 is indicated by 11). That is, a value of s corresponding to one state value is 2. Assuming that the 4-bit antenna panel state information is 1100, a state of the panel #4 indicated by the state value 11 is the first state, and a state of the panel #1 indicated by the state value 00 is the first state. That is, the antenna panel state information indicates that the state of the panel #4 is the first state and the state of the panel #1 is the first state.

Case 2: The states of the antenna panels indicated by the antenna panel state information are all the second state.

For example, it is assumed that the terminal device has a total of four antenna panels (a panel #1, a panel #2, a panel #3, and a panel #4), and a value of P is 2. One antenna panel may be indicated by using 2 bits (for example, the panel #1 is indicated by 00, the panel #2 is indicated by 01, the panel #3 is indicated by 10, and the panel #4 is indicated by 11). That is, a value of s corresponding to one state value is 2. Assuming that the 4-bit antenna panel state information is 1100, a state of the panel #4 indicated by the state value 11 is the second state, and a state of the panel #1 indicated by the state value 00 is the second state. That is, the antenna panel state information indicates that the state of the panel #4 is the second state and the state of the panel #1 is the second state.

Case 3: Some state bits of the antenna panel state information indicate information about an antenna panel in the first state, and the other state bits of the antenna panel state information indicate information about an antenna panel in the second state.

For example, it is assumed that the terminal device has a total of four antenna panels (a panel #1, a panel #2, a panel #3, and a panel #4), and a value of P is 2. One antenna panel may be indicated by using 2 bits (for example, the panel #1 is indicated by 00, the panel #2 is indicated by 01, the panel #3 is indicated by 10, and the panel #4 is indicated by 11). That is, a value of s corresponding to one state value is 2. Assuming that the 4-bit antenna panel state information is 1100, a state of the panel #4 indicated by the state value 11 is the first state, and a state of the panel #1 indicated by the state value 00 is the second state. That is, the antenna panel state information indicates that the state of the panel #4 is the first state and the state of the panel #1 is the second state.

It should be understood that a correspondence between the state value in the antenna panel state information and the state of the antenna panel may be notified by the terminal device to the network device. For example, the correspondence may alternatively be carried in the channel state information, for example, may be a part of the antenna panel state information. Alternatively, the correspondence may be sent to the network device by using information other than the channel state information. Alternatively, a correspondence between the state value in the antenna panel state information and the state of the antenna panel may be indicated by the network device to the terminal device. Alternatively, a correspondence between the state value in the antenna panel state information and the state of the antenna panel may be predefined in a protocol.

Optionally, the $j^{th}$ piece of antenna panel state information in the K pieces of antenna panel state information may correspond to at least one set of channel quality information in the M sets of channel quality information, and j is a positive integer greater than or equal to 1. In other words, one of the K pieces of antenna panel state information may correspond to at least one set of channel quality information in the M sets of channel quality information. In other words, each of the K pieces of antenna panel state information may correspond to at least one set of channel quality information in the M sets of channel quality information. There may be the following one or more cases for a correspondence between the K pieces of antenna panel state information and the M sets of channel quality information:

Case 1: One of the K pieces of antenna panel state information may correspond to one of the M sets of channel quality information.

Case 2: One of the K pieces of antenna panel state information may correspond to a plurality of sets of channel quality information in the M sets of channel quality information. For example, if M is an integer greater than 2, the value of K may be a positive integer greater than 1 and less than M. In this case, one of the K pieces of antenna panel state information may correspond to a plurality of sets of channel quality information in the M sets of channel quality information.

Case 3: One of the K pieces of antenna panel state information corresponds to one of the M sets of channel quality information, and another piece of antenna panel state information corresponds to a plurality of sets of channel quality information in the M sets of channel quality information.

Case 4: The value of K is equal to 1. In other words, the channel state information includes only one piece of antenna panel state information. In this case, the antenna panel state information corresponds to the M sets of channel quality information. When determining that the received channel state information includes only one piece of antenna panel state information, the network device may determine that the antenna panel state information corresponds to the M sets of channel quality information included in the channel state information.

Case 5: The value of K is equal to M. In other words, the channel state information includes M pieces of antenna panel state information. For example, an $m^{th}$ piece of antenna panel state information in the K pieces of antenna panel state information corresponds to an $m^{th}$ set of channel quality information in the M sets of channel quality information, and m is an integer greater than or equal to 1 and less than or equal to M. For example, the $1^{st}$ piece of antenna panel state information in the K pieces of antenna panel state information corresponds to the $1^{st}$ set of channel quality information in the M sets of channel quality information, the $2^{nd}$ piece of antenna panel state information in the K pieces of antenna panel state information corresponds to the $2^{nd}$ set of channel quality information in the M sets of channel quality information, . . . , and a $K^{th}$ piece of antenna panel state information in the K pieces of antenna panel state information corresponds to an $M^{th}$ set of channel quality information in the M sets of channel quality information. K is equal to M.

Optionally, in the foregoing content, the correspondence between the K pieces of antenna panel state information and the M sets of channel quality information may be predefined in a protocol (for example, Case 4 and Case 5). The correspondence between the K pieces of antenna panel state information and the M sets of channel quality information may alternatively be notified by the terminal device to the network device by using indication information (which may be referred to as correspondence indication information). The correspondence indication information may be carried in the channel state information, or may be carried in information other than the channel quality information. For example, it is assumed that the value of K is 3, a value of M is 6, and the correspondence indication information may indicate that the $1^{st}$ piece of antenna panel state information in the three pieces of antenna panel state information corresponds to the $1^{st}$ set of channel quality information and the $2^{nd}$ set of channel quality information in the six sets of channel quality information, the $2^{nd}$ piece of antenna panel state information corresponds to the $3^{rd}$ set of channel quality information in the six sets of channel quality information, and the $3^{rd}$ piece of antenna panel state information corresponds to the $4^{th}$ set of channel quality information to the $6^{th}$ set of channel quality information in the six sets of channel quality information. The correspondence between the K pieces of antenna panel state information and the M sets of channel quality information may alternatively be determined by the network device based on values of K and M. For example, if M can be exactly divided by K, the $j^{th}$ piece of antenna panel state information in the K pieces of antenna panel state information corresponds to a $(1+(j-1)\times M/K)^{th}$ to $(j\times M/K)^{th}$ set of channel quality information in the M sets of channel quality information. For example, if M is equal to 4 and K is equal to 2, the $1^{st}$ piece of antenna panel state information in the two pieces of antenna panel state information corresponds to the $1^{st}$ set of channel quality information and the $2^{nd}$ set of channel quality information in the four sets of channel quality information, and the $2^{nd}$ piece of antenna panel state information corresponds to the $3^{rd}$ set of channel quality information and the $4^{th}$ set of channel quality information.

In a possible implementation, a maximum quantity of antenna panels whose states are indicated by one of the K pieces of antenna panel state information as the first state is configured by the network device. In other words, one of the K pieces of antenna panel state information may indicate that states of a maximum of $P_{max}$ antenna panels are the first state, and a value of $P_{max}$ is configured by the network device. The network device may send antenna panel feedback indication information to the terminal device, where the antenna panel feedback indication information indicates the maximum quantity $P_{max}$ of antenna panels whose states can be indicated by one piece of antenna panel state information as the first state.

In another possible implementation, a maximum quantity of antenna panels whose states are indicated by one of the K pieces of antenna panel state information as the first state is stored in the terminal device. In other words, one of the K pieces of antenna panel state information may indicate that states of a maximum of $P_{max}$ antenna panels are the first state, and a value of $P_{max}$ is stored in the terminal device.

In another possible implementation, the terminal device may report, to the network device, a maximum quantity of antenna panels whose states are indicated by one of the K pieces of antenna panel state information as the first state. In other words, one of the K pieces of antenna panel state information may indicate that states of a maximum of $P_{max}$ antenna panels are the first state, a value of $P_{max}$ is determined by the terminal device, and the terminal device may report the value of $P_{max}$ to the network device. The value may be used as a parameter for terminal device capability reporting.

In a possible implementation, if a quantity of antenna panels whose states are the first state in the terminal device is greater than $P_{max}$, the $P_{max}$ antenna panels whose states are indicated by the antenna panel state information as the first state may be $P_{max}$ antenna panels that have best channel quality and whose states are the first state.

In another possible implementation, if a quantity of antenna panels whose states are the first state in the terminal device is greater than $P_{max}$, the $P_{max}$ antenna panels whose states are indicated by the antenna panel state information as the first state may be any $P_{max}$ antenna panels whose states are the first state.

3. The M Sets of Channel Quality Information

One of the M sets of channel quality information includes at least one piece of channel quality information. Alternatively, in other words, each of the M sets of channel quality information may include at least one piece of channel quality information.

The channel quality information in this embodiment of this application may be any one or more of reference signal received power (reference signal receiving power, RSRP), a channel quality indicator (channel quality indicator, CQI), a block error ratio (block error ratio, BLER), a signal to interference plus noise ratio (signal to Interference plus noise ratio, SINR), or a signal-to-noise ratio (signal-to-noise ratio, SNR).

If M is a positive integer greater than or equal to 2, quantities of channel quality information included in any two of the M sets of channel quality information may be the same, or may be different.

As described above, the $j^{th}$ piece of antenna panel state information in the K pieces of antenna panel state information corresponds to the at least one set of channel quality information in the M sets of channel quality information. When the $j^{th}$ piece of antenna panel state information indicates that the states of the $P_j$ antenna panels are the first state, an $i^{th}$ set of channel quality information in the at least one set of channel quality information includes a total of $P_j$ pieces of channel quality information, the $P_j$ pieces of channel quality information are in a one-to-one correspondence with the $P_j$ antenna panels, and i is a positive integer greater than or equal to 1 and less than or equal to M.

In other words, any one of the at least one set of channel quality information corresponding to the $j^{th}$ piece of antenna panel state information may include $P_j$ pieces of channel quality information, and the $P_j$ pieces of channel quality information are in a one-to-one correspondence with the $P_j$ antenna panels whose states are indicated by the $j^{th}$ piece of antenna panel state information as the first state.

For ease of description, the following uses the $m^{th}$ set of channel quality information in the M sets of channel quality information as an example (m is a positive integer greater than or equal to 1 and less than or equal to M) to describe the channel quality information, the antenna panel state information, and the reference signals.

It is assumed that antenna panel state information $K_m$ in the K pieces of antenna panel state information is antenna panel state information corresponding to the $m^{th}$ set of channel quality information. The antenna panel state information $K_m$ may indicate $P_m$ antenna panels whose states are the first state and $P-P_m$ antenna panels whose states is the second state (if $P_m$ is less than P). For ease of description, the $P_m$ antenna panels whose states are indicated by the antenna panel state information $K_m$ as the first state are referred to as $P_m$ first antenna panels below. Correspondingly, the $m^{th}$ set of channel quality information includes $P_m$ pieces of channel quality information. The $P_m$ pieces of channel quality information are in a one-to-one correspondence with the $P_m$ first antenna panels indicated by the antenna panel state information $K_m$. In other words, the $1^{st}$ piece of channel quality information in the $P_m$ pieces of channel quality information corresponds to the $1^{st}$ first antenna panel in the $P_m$ first antenna panels, the $2^{nd}$ piece of channel quality information corresponds to the $2^{nd}$ first antenna panel in the $P_m$ first antenna panels (if $P_m$ is greater than 1), and so on.

As described above, the M sets of channel quality information may be in a one-to-one correspondence with the M reference signals. In this case, the $m^{th}$ set of channel quality information is in a one-to-one correspondence with an $m^{th}$ reference signal in the M reference signals. The $P_m$ pieces of channel quality information included in the $m^{th}$ set of channel quality information are obtained by measuring the $m^{th}$ reference signal on $P_m$ antenna panels. The $P_m$ antenna panels may be antenna panels for receiving the $m^{th}$ reference signal. In other words, the $P_m$ antenna panels may be $P_m$ receive (receive, Rx) antenna panels. For ease of description, the $P_m$ antenna panels for receiving the reference signal may be referred to as $P_m$ second antenna panels.

Optionally, in a possible implementation, the $P_m$ first antenna panels are $P_m$ Rx antenna panels. In this case, the $P_m$ first antenna panels are the same as the $P_m$ second antenna panels. One of the $P_m$ pieces of channel quality information is obtained through measurement on a corresponding antenna panel. In other words, the $1^{st}$ piece of channel quality information in the $P_m$ pieces of channel quality information is obtained through measurement on the $1^{st}$ first antenna panel in the $P_m$ first antenna panels, the $2^{nd}$ piece of channel quality information is obtained through measurement on the $2^{nd}$ first antenna panel in the $P_m$ first antenna panels, and so on.

Optionally, in another possible implementation, the $P_m$ first antenna panels are $P_m$ transmit (transmit, Tx) antenna panels. In this case, the $P_m$ first antenna panels are in a one-to-one correspondence with the $P_m$ second antenna panels. The $P_m$ first antenna panels are determined based on the $P_m$ second antenna panels.

When there is an uplink and downlink beam reciprocity (beam correspondence), the terminal device may determine, based on the receive (receive, Rx) antenna panels for receiving the reference signal, transmit (Transmit, Tx) antenna panels corresponding to the Rx antenna panels. The Tx antenna panel and the Rx antenna panel may be a same antenna panel, or the Tx antenna panel and the Rx antenna panel may be two different antenna panels having an association relationship. In other words, the first antenna panel and the corresponding second antenna panel may be a same antenna panel, or may be different antenna panels. Therefore, in some possible implementations, the $P_m$ first antenna panels may be the same as the $P_m$ second antenna panels. In some other possible implementations, the $P_m$ first antenna panels may be different from the $P_m$ second antenna panels. In some other possible implementations, some of the $P_m$ first antenna panels may be the same as corresponding second antenna panels, and the other first antenna panels are different from corresponding second antenna panels.

It should be understood that the antenna panel indicated by the antenna panel state information may be a transmit antenna panel of the terminal device. Alternatively, the antenna panel indicated by the antenna panel state information may be a receive antenna panel of the terminal device. Alternatively, the antenna panels indicated by the antenna panel state information may be a receive antenna panel of the terminal device and a transmit antenna panel of the terminal device. Alternatively, the antenna panel indicated by the antenna panel state information may be a transmit antenna panel of the terminal device that has a correspondence with a receive antenna panel of the terminal device. Alternatively, the antenna panel indicated by the antenna panel state information is both a transmit antenna panel of the terminal device and a receive antenna panel of the network device.

Lengths of any two of the $P_m$ pieces of channel quality information may be the same. Therefore, the network device may determine a quantity of first antenna panels based on the antenna panel state information $K_m$. The quantity of first antenna panels may be the same as a quantity of channel quality information included in one set of channel quality information corresponding to the antenna panel state information $K_m$. Therefore, after determining the quantity of first antenna panels, the network device may determine the quantity of channel quality information included in the corresponding set of channel quality information. In this case, the network device may directly determine a length of one set of channel quality information. Therefore, the network device does not need to determine, through blind detection, a quantity of channel quality information reported by the terminal device.

In a possible implementation, channel quality indicated by the M sets of channel quality information is all greater than a preset threshold. In other words, channel quality indicated by channel quality information used to indicate channel quality in the M sets of channel quality information sent by the terminal device is all greater than the preset threshold. The preset threshold may be prestored in the terminal device, or may be configured by the network device.

In another possible implementation, when a quantity of antenna panels in the first state that are indicated by one piece of antenna panel state information is greater than 1, channel quality indicated by channel quality information corresponding to the antenna panel state information is greater than or equal to a preset threshold. When a quantity of antenna panels in the first state that are indicated by one piece of antenna panel state information is equal to 1, channel quality indicated by channel quality information corresponding to the antenna panel state information may not need to be greater than the preset threshold.

In another possible implementation, channel quality information indicated by the M sets of channel quality information may be irrelevant to a threshold. In other words, channel quality indicated by one of the M sets of channel quality information does not need to be greater than a preset threshold.

In a possible implementation, if a state of one antenna panel is the first state, but no signal is measured by using the antenna panel, channel quality information corresponding to the antenna panel may be a preset value. The preset value may indicate that no reference signal is measured on the antenna panel corresponding to the channel quality information. The preset value may be least significant bits of the channel quality information, for example, 000000.

Optionally, in some embodiments, the channel state information may be divided into two parts of information, which are respectively referred to as a first part of information and a second part of information. The first part of information and the second part of information may be independently encoded.

It should be noted that, in this specification, independent encoding means that two pieces of information are independently encoded before being sent, two bit sequences are generated after the encoding, and the two encoded bit sequences are separately mapped to different time-frequency-space resources (time domain resources, frequency domain resources, and/or space domain resources are different) and are sent by one device to another device. After receiving the two encoded bit sequences, the another device separately decodes the two bit sequences on the two resources to obtain the two pieces of information. For example, that the first part of information and the second part of information are independently encoded means that the first part of information and the second part of information are obtained through separate encoding. For example, the first part of information is represented by Q1 bits, and the second part of information is represented by Q2 bits. The terminal device encodes the Q1 bits to obtain Q1' bits, and encodes the Q2 bits to obtain Q2' bits. The terminal device sends the Q1' bits and the Q2' bits to the network device. The network device decodes the Q1' bits to obtain the first part of information, and decodes the Q2' bits to obtain the second part of information.

Content carried in the first part of information and content carried in the second part of information may have different composition manners.

An example is as follows: Composition manner 1: The first part of information may include the resource indexes of the M reference signals, the K pieces of antenna panel state information, and the M pieces of channel quality information, and the second part of information may include channel quality information other than the channel quality information (that is, the M pieces of channel quality information) included in the first part of information in the M sets of channel quality information. The M pieces of channel quality information respectively belong to the M sets of channel quality information. In other words, the M pieces of channel quality information are in a one-to-one correspondence with the M sets of channel quality information, and one of the M pieces of channel quality information is one piece of channel quality information in a corresponding set of channel quality information. Optionally, in some embodiments, one of the M pieces of channel quality information may be the $1^{st}$ piece of channel quality information in a corresponding set of channel quality information. Optionally, in some other embodiments, one of the M pieces of channel quality information is the last piece of channel quality information in a corresponding set of channel quality information. Optionally, in some other embodiments, one of the M pieces of channel quality information may be any piece of channel quality information in a corresponding set of channel quality information.

Another example is as follows: Composition manner 2: The first part of information may include the resource indexes of the M reference signals and the K pieces of antenna panel state information, and the second part of information may include the M sets of channel quality information.

Another example is as follows: Composition manner 3: The first part of information may include the resource indexes of the M reference signals, the K pieces of antenna panel state information, and w pieces of channel quality information, and the second part of information may include channel quality information other than the channel quality information included in the first part in the M sets of channel quality information. w may be a positive integer greater than or equal to 0. Optionally, in some embodiments, the w pieces of channel quality information included in the first part of information may be the $1^{st}$ piece of channel quality information in the $1^{st}$ set of channel quality information in the M sets of channel quality information. Optionally, in some other embodiments, the w pieces of channel quality information included in the first part of information may be the last piece of channel quality information in the $1^{st}$ set of channel quality information in the M sets of channel quality information. Optionally, in some other embodiments, the w pieces of channel quality information included in the first part of information may be the $1^{st}$ piece of channel quality information in the last set of channel quality information in the M sets of channel quality information. Optionally, in some other embodiments, the w pieces of channel quality information included in the first part of information may be the last piece of channel quality information in the last set of channel quality information in the M sets of channel quality information.

It may be understood that, if each of the M sets of channel quality information includes only one piece of channel quality information and the composition manner 1 is used, the terminal device may send only the first part of information, and does not need to send the second part of information. Similarly, if the value of M is 1 and there is only one piece of channel quality information in one set of channel quality information, the terminal device may send only the first part of information. Therefore, when the composition manner 1 or the composition manner 3 is used, in some cases, the terminal device may send only the first part of information, and does not need to send the second part of information. In this way, signaling overheads can be reduced.

When the composition manner 1 is used, the terminal device may encode the resource indexes of the M reference signals, the K pieces of antenna panel state information, and the M pieces of channel quality information, to obtain a first encoding result, and encode the channel quality information other than the channel quality information (that is, the M pieces of channel quality information) included in the first part of information in the M sets of channel quality information, to obtain a second encoding result.

When the composition manner 2 is used, the terminal device may encode the resource indexes of the M reference signals and the K pieces of antenna panel state information, to obtain a first encoding result, and encode the M sets of channel quality information, to obtain a second encoding result.

When the composition manner 3 is used, the terminal device may encode the resource indexes of the M reference signals, the K pieces of antenna panel state information, and the w pieces of channel quality information, to obtain a first encoding result, and encode the channel quality information other than the channel quality information included in the first part of information in the M sets of channel quality information, to obtain a second encoding result.

The network device receives the channel state information, and may first decode the first encoding result to obtain the first part of information, and determine a length of the second encoding result based on the K pieces of antenna panel state information in the first part of information, to obtain through decoding the second part of information. For example, in an implementation, a quantity of resource indexes of reference signals sent by the terminal device may be configured by the network device. In other words, the value of M may be configured by the network device. Therefore, the network device may determine, based on the configured value of M, a quantity of sets of channel quality information included in the channel state information, and determine, with reference to the K pieces of antenna panel state information, a corresponding quantity of channel quality information included in each set of channel quality information. For another example, in another implementation, the network device may determine, based on a quantity of resource indexes of reference signals, a quantity of sets of channel quality information included in the channel state information, and determine, with reference to the K pieces of antenna panel state information, a corresponding quantity of channel quality information included in each set of channel quality information. Therefore, the network device may determine the length of the second encoding result based on the quantity of sets of channel quality information and the quantity of channel quality information included in each set of channel quality information. In this way, the network device can determine the second part of information based on the first part of information without a need of performing blind detection, thereby reducing implementation complexity of the network device and reducing load of the network device.

Figure 3:
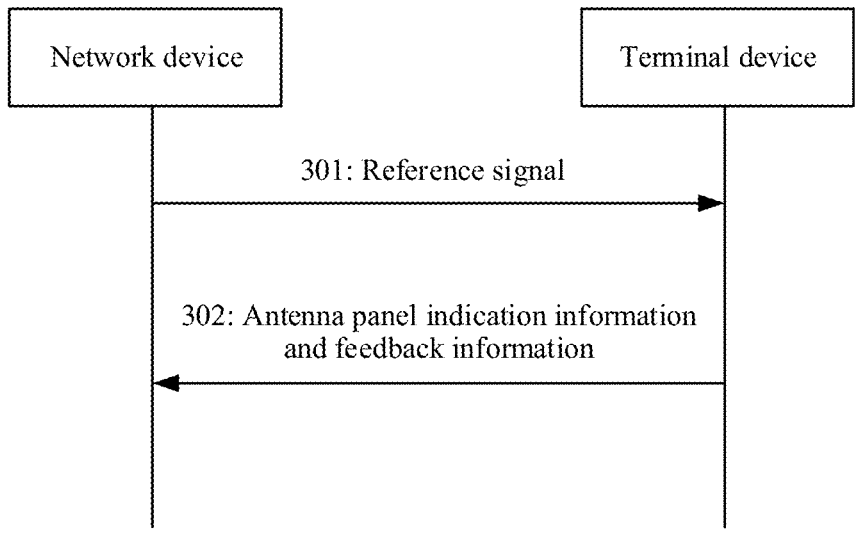
FIG. 3 shows a method for sending a reference signal measurement result according to an embodiment of this application.

FIG. 3 shows a method for sending a reference signal measurement result according to an embodiment of this application. The method may include the following steps.

301: A network device sends a reference signal to a terminal device. Correspondingly, the terminal device receives the reference signal from the network device.

302: The terminal device sends antenna panel indication information and feedback information to the network device, where the antenna panel indication information indicates N antenna panels or states of the N antenna panels, the feedback information indicates that the reference signal is not measured on the N antenna panels, and N is a positive integer greater than or equal to 1.

Optionally, there may be the following several implementations for a total quantity of antenna panels or a quantity of states of antenna panels indicated by the antenna panel indication information:

Implementation 1: The total quantity of antenna panels or the quantity of states of antenna panels indicated by the antenna panel indication information may be a total quantity of antenna panels included in the terminal device. For example, the terminal device has a total of P antenna panels. The P antenna panels may be P transmit antenna panels or P receive antenna panels, or a total quantity of transmit antenna panels and receive antenna panels is P. P is a positive integer greater than or equal to 1.

Implementation 2: The total quantity of antenna panels or the quantity of states of antenna panels indicated by the antenna panel indication information may be a quantity of antenna panels reported by using a terminal device capability parameter. For example, P antenna panels are reported by using a terminal device capability. The P antenna panels may be P transmit antenna panels or P receive antenna panels, or a total quantity of transmit antenna panels and receive antenna panels is P. P is a positive integer greater than or equal to 1.

Implementation 3: The total quantity of antenna panels or the quantity of states of antenna panels indicated by the antenna panel indication information may be sent by the terminal device to the network device.

Implementation 4: The total quantity of antenna panels or the quantity of states of antenna panels indicated by the antenna panel indication information may be indicated by the network device to the terminal device by using indication information (which may also be understood as that the terminal device determines, based on the indication information of the network device, a quantity of antenna panel information indicated by the antenna panel indication information of the terminal device).

Implementation 5: The total quantity of antenna panels or the quantity of states of antenna panels indicated by the antenna panel indication information may be predefined in a protocol.

Optionally, in some embodiments, the antenna panel indication information may indicate the N antenna panels by using a bitmap (bitmap, which may also be referred to as a bitmap). A length of the bitmap may be the same as the quantity of antenna panels included in the terminal device, each bit in the bitmap may correspond to one antenna panel, and a value of the bit may be used to indicate a corresponding antenna panel or a state of the antenna panel.

If the terminal device includes P antenna panels, the antenna panel indication information may be a bitmap whose length is P, and P is a positive integer greater than or equal to N.

Optionally, in a possible implementation, an antenna panel corresponding to a bit whose bit value is 1 in the bitmap is an antenna panel that is in the P antenna panels and that belongs to the N antenna panels, and an antenna panel corresponding to a bit whose bit value is 0 is an antenna panel that is in the P antenna panels and that does not belong to the N antenna panels. The P antenna panels are in a one-to-one correspondence with P bits in the bitmap. The P antenna panels in the terminal device may be sorted in sequence. For example, the P antenna panels may be respectively an antenna panel 1, an antenna panel 2, an antenna panel 3, . . . , and an antenna panel P. In this case, the $1^{st}$ bit in the P bits may correspond to the antenna panel 1, the $2^{nd}$ bit may correspond to the antenna panel 2, the $3^{rd}$ bit may correspond to the antenna panel 3, and so on.

For example, assuming that a value of P is 4, the antenna panel indication information may be a bitmap whose length is 4 bits. Assuming that the 4-bit bitmap is 1001, it indicates that the N antenna panels include a total of two antenna panels, and the two antenna panels are respectively the antenna panel 1 and the antenna panel 4 of the terminal device.

In another implementation, the antenna panel indication information may indicate the N antenna panels in the P antenna panels by using state values. One piece of antenna panel indication information may include one or more state values. One state value may include s bits, one state value may be used to indicate a state of one antenna panel, and s is a positive integer greater than or equal to 1. In other words, in this case, one state value indicates one antenna panel.

Specifically, there may be the following several cases for indication of the antenna panel indication information:

Case 1: An antenna panel indicated by the antenna panel state information belongs to the N antenna panels.

For example, it is assumed that the terminal device has a total of four antenna panels (a panel #1, a panel #2, a panel #3, and a panel #4), and a value of P is 2. One antenna panel may be indicated by using 2 bits (for example, the panel #1 is indicated by 00, the panel #2 is indicated by 01, the panel #3 is indicated by 10, and the panel #4 is indicated by 11). That is, a value of s corresponding to one state value is 2. Assuming that the 4-bit antenna panel state information is 1100, the panel #4 indicated by the state value 11 belongs to the N antenna panels, and the panel #1 indicated by the state value 00 belongs to the N antenna panels. That is, no reference signal is measured on the panel #4 and the panel #1.

Case 2: An antenna panel indicated by the antenna panel state information does not belong to the N antenna panels. In this case, the network device may determine, based on an antenna panel on which a reference signal has been measured, an antenna panel on which no reference signal is measured.

For example, it is assumed that the terminal device has a total of four antenna panels (a panel #1, a panel #2, a panel #3, and a panel #4), and a value of P is 2. One antenna panel may be indicated by using 2 bits (for example, the panel #1 is indicated by 00, the panel #2 is indicated by 01, the panel #3 is indicated by 10, and the panel #4 is indicated by 11). That is, a value of s corresponding to one state value is 2. Assuming that the 4-bit antenna panel state information is 1100, the panel #4 indicated by the state value 11 does not belong to the N antenna panels, and the panel #1 indicated by the state value 00 does not belong to the N antenna panels. That is, a reference signal is measured on the panel #4 and the panel #1. No reference signal is measured on the panel #2 and the panel #3.

For example, the antenna panel indication information may include a sequence number of an antenna panel that belongs to the N antenna panels. For example, it is assumed that the terminal device includes four antenna panels, which are respectively an antenna panel 1, an antenna panel 2, an antenna panel 3, and an antenna panel 4. If the antenna panel 1 and the antenna panel 4 belong to the N antenna panels, the antenna panel information may include 001 (that is, 1 in binary representation) and 100 (that is, 4 in binary representation). Alternatively, in some other embodiments, the antenna panel indication information may include a sequence number of an antenna panel that does not belong to the N antenna panels. In this case, the network device may determine, based on the sequence number of the antenna panel that does not belong to the N antenna panels, an antenna panel that belongs to the N antenna panels.

Optionally, in another possible implementation, the antenna panel indication information indicates the state of the antenna panel by using the foregoing method (that is, the bitmap is used or the sequence number of the antenna panel is indicated). The bitmap is used as an example. The antenna panel corresponding to the bit whose bit value is 1 is an antenna panel in a state in which transmission can be performed, and the antenna panel corresponding to the bit whose bit value is 0 is an antenna panel in a state in which transmission cannot be performed. The N antenna panels are antenna panels whose states are the state in which transmission can be performed. The sequence number of the antenna panel is used as an example. The sequence number of the antenna panel included in the antenna panel indication information indicates an antenna panel in the state in which transmission can be performed. For a specific implementation in which the antenna panel indication information indicates the state of the antenna panel, refer to the implementation in which the antenna panel state information indicates the state of the antenna panel in the foregoing embodiment. For specific meanings of a first state and a second state, reference may also be made to the embodiment shown in FIG. 2. For brevity, details are not described herein again.

Optionally, in a possible implementation, the terminal device may feedback the antenna panel indication information and the feedback information by using one piece of channel quality feedback information that is agreed upon with the network device. The channel quality feedback information includes two fields, content carried in the $1^{st}$ field in the two fields is the antenna panel indication information, and content carried in the $2^{nd}$ field is the feedback information. If a value of the $2^{nd}$ field is a preset value, for example, 00, 11, or 0000, it indicates that no reference signal is measured on the N antenna panels indicated by the $1^{st}$ field. In this way, after receiving the antenna panel indication information and the feedback information, the network device may determine antenna panels that are antenna panels that can be used for communication and on which no reference signal is measured.

Optionally, in some embodiments, the channel quality feedback information may further include the $3^{rd}$ field, and the $3^{rd}$ field may carry a resource index of the reference signal. In this way, the network device may determine a specific reference signal that is not measured on the antenna panel.

Optionally, in another possible implementation, the terminal device may use channel quality information as the feedback information.

Optionally, in another possible implementation, the feedback information may be one piece of channel quality information. The channel quality information may be a preset value. When receiving the channel quality information, the network device may determine that no reference signal is measured on the N antenna panels and the N antenna panels are antenna panels whose states are the state in which transmission can be performed.

Optionally, in another possible implementation, the feedback information may include N pieces of channel quality information, and the N pieces of channel quality information are in a one-to-one correspondence with the N antenna panels. The channel quality information may be a preset value. When receiving the N pieces of channel quality information, the network device may determine that no reference signal is measured on the N antenna panels.

Optionally, in some embodiments, the preset value may be a predetermined value, for example, 000111, 111010, or 111111.

Optionally, in some other embodiments, the preset value may be a minimum state value of the channel quality information, for example, 000000.

The method for sending channel state information shown in FIG. 2 may be combined with the method for sending a reference signal measurement result shown in FIG. 3. In other words, the channel state information shown in FIG. 2 may also be used to indicate an antenna panel on which no measurement is performed.

The $m^{th}$ set of channel quality information in the M sets of channel quality information is still used as an example. If a value of one or more pieces of channel quality information in the $m^{th}$ set of channel quality information is the preset value or a least significant bit of the channel quality information, an antenna panel whose state is the first state and that corresponds to the channel quality information is an antenna panel on which the $m^{th}$ reference signal is not measured.

Figure 4:
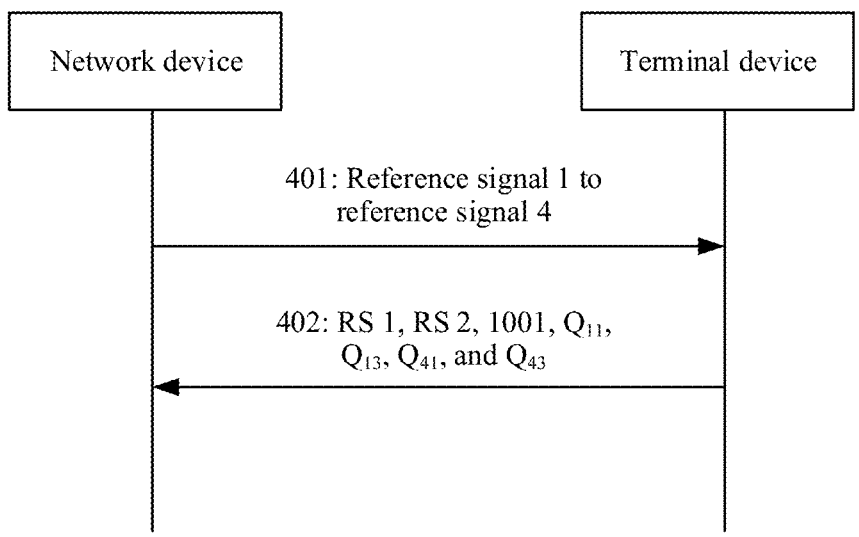
FIG. 4 is a schematic flowchart of a method for sending channel state information according to an embodiment of this application.
Figure 5:
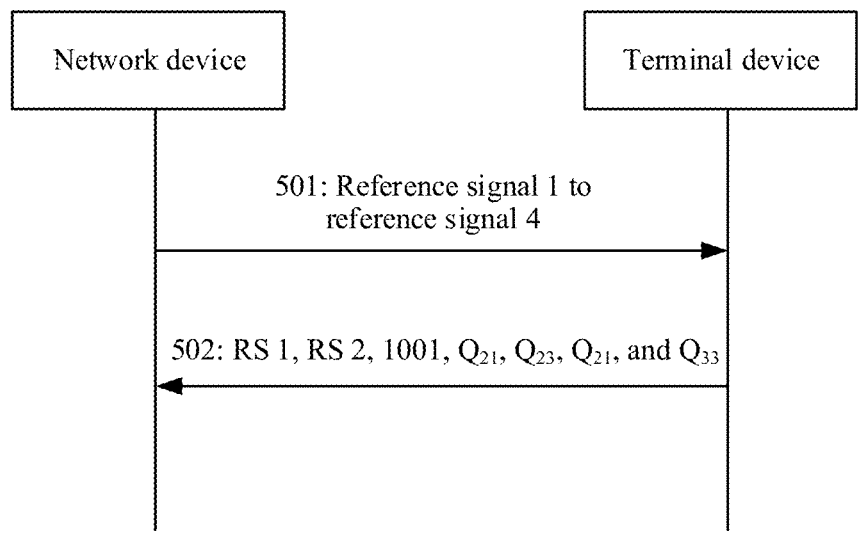
FIG. 5 is a schematic flowchart of a method for sending channel state information according to an embodiment of this application.

The following describes the technical solutions in this application with reference to FIG. 4 and FIG. 5.

FIG. 4 is a schematic flowchart of a method for sending channel state information according to an embodiment of this application. It is assumed that a terminal device in the embodiment shown in FIG. 4 includes four antenna panels, which are respectively an antenna panel 1, an antenna panel 2, an antenna panel 3, and an antenna panel 4. For ease of description, it is assumed that an Rx antenna panel and a Tx antenna panel in the terminal device are the same. In other words, the antenna panel 1 to the antenna panel 4 may serve as both Rx antenna panels and Tx antenna panels. It is assumed that the antenna panel 1 and the antenna panel 4 are antenna panels in an active state, and the antenna panel 2 and the antenna panel 3 are antenna panels in an inactive state.

401: A network device sends a reference signal 1, a reference signal 2, a reference signal 3, and a reference signal 4 to the terminal device. Correspondingly, the reference signal 1 to the reference signal 4 are received by using the antenna panel 1 and the antenna panel 4 of the terminal device. For ease of description, the following assumes that a resource index of the reference signal 1 is RS 1, a resource index of the reference signal 2 is RS 2, a resource index of the reference signal 3 is RS 3, and a resource index of the reference signal 4 is RS 4.

It is assumed that the terminal device measures the reference signal 1 and the reference signal 3. As described above, only the antenna panel 1 and the antenna panel 4 in the terminal device are in the active state. Therefore, it is assumed that the reference signal 1 and the reference signal 3 are measured on both the antenna panel 1 and the antenna panel 4.

It is assumed that channel quality information obtained by measuring the reference signal 1 on the antenna panel 1 is $Q_{11}$, channel quality information obtained by measuring the reference signal 3 on the antenna panel 1 is $Q_{13}$, channel quality information obtained by measuring the reference signal 1 on the antenna panel 4 is $Q_{41}$, and channel quality information obtained by measuring the reference signal 3 on the antenna panel 4 is $Q_{43}$.

402: The terminal device sends channel state information to the network device, where the channel state information includes resource indexes of two reference signals, one piece of antenna panel state information, and two sets of channel quality information.

The resource indexes of the two reference signals are respectively the resource index RS 1 of the reference signal 1 and the resource index RS 2 of the reference signal 2.

Because the two sets of channel quality information fed back by the terminal device are obtained through measurement on both the antenna panel 1 and the antenna panel 4, the channel state information may include only one piece of antenna panel state information. The antenna panel state information may be a bitmap whose length is 4, and a value of the bitmap may be 1001. The four bits in the bitmap correspond to four antenna panels of the terminal device, that is, the antenna panel 1 to the antenna panel 4. A bit whose bit value is 1 indicates an active state of a corresponding antenna panel, and a bit whose bit value is 0 indicates an inactive state of a corresponding antenna panel. Therefore, based on the bitmap, it may be determined that states of the antenna panel 1 and the antenna panel 4 are the active state, and states of the antenna panel 2 and the antenna panel 3 are the inactive state.

The $1^{st}$ set of channel quality information in the two sets of channel quality information may include $Q_{11}$ and $Q_{41}$, that is, the channel quality information obtained by measuring the reference signal 1 on the antenna panel 1 and the antenna panel 4, and the $2^{nd}$ set of channel quality information may include $Q_{13}$ and $Q_{43}$, that is, the channel quality information obtained by measuring the reference signal 3 on the antenna panel 1 and the antenna panel 4.

Assuming that the channel state information is divided by using the foregoing composition manner 1, the first part of information may include the resource index (that is, RS 1) of the reference signal 1, the resource index (RS 2) of the reference signal 2, the antenna panel state information (that is, 1001), one piece of channel quality information (for example, $Q_{11}$) in the $1^{st}$ set of channel quality information, and one piece of channel quality information (for example, $Q_{13}$) in the $2^{nd}$ set of channel quality information, and the second part of information may include remaining channel quality information (for example, $Q_{41}$ and $Q_{43}$) in the two sets of channel quality information.

FIG. 5 is a schematic flowchart of a method for sending channel state information according to an embodiment of this application. It is assumed that a terminal device in the embodiment shown in FIG. 5 includes four antenna panels, which are respectively an antenna panel 1, an antenna panel 2, an antenna panel 3, and an antenna panel 4. For ease of description, it is assumed that an Rx antenna panel and a Tx antenna panel in the terminal device are the same. In other words, the antenna panel 1 to the antenna panel 4 may serve as both Rx antenna panels and Tx antenna panels. It is assumed that the antenna panel 1 and the antenna panel 4 are antenna panels in an active state, and the antenna panel 2 and the antenna panel 3 are antenna panels in an inactive state.

501: A network device sends a reference signal 1, a reference signal 2, a reference signal 3, and a reference signal 4 to the terminal device. Correspondingly, the reference signal 1 to the reference signal 4 are received by using the antenna panel 1 and the antenna panel 4 of the terminal device. For ease of description, the following assumes that a resource index of the reference signal 1 is RS 1, a resource index of the reference signal 2 is RS 2, a resource index of the reference signal 3 is RS 3, and a resource index of the reference signal 4 is RS 4.

It is assumed that the terminal device measures the reference signal 1 and the reference signal 3. As described above, only the antenna panel 1 and the antenna panel 4 in the terminal device are in the active state. Therefore, it is assumed that the reference signal 1 and the reference signal 3 are measured on both the antenna panel 1 and the antenna panel 4.

It is assumed that channel quality information obtained by measuring the reference signal 1 on the antenna panel 1 is $Q_{11}$, channel quality information obtained by measuring the reference signal 3 on the antenna panel 1 is $Q_{13}$, channel quality information obtained by measuring the reference signal 1 on the antenna panel 4 is $Q_{41}$, and channel quality information obtained by measuring the reference signal 3 on the antenna panel 4 is $Q_{43}$.

It is assumed that before sending, to the network device, channel state information used to indicate measurement results of the antenna panel 1 and the antenna panel 4, the terminal device finds that the antenna panel 1 and the antenna panel 4 are not suitable for communicating with the network device (for example, radiation of the antenna panel to a human body is relatively large (for example, higher than a preset threshold) or channel quality measured on the antenna panel is excessively low (for example, lower than a preset threshold)), and the terminal device indicates that states of the antenna panel 2 and the antenna panel 3 are a first state. In this case, states of the antenna panel 1 and the antenna panel 4 may be a second state, and the states of the antenna panel 2 and the antenna panel 3 may be the first state. In this case, the terminal device may also send channel state information to the network device.

502: The terminal device sends channel state information to the network device, where the channel state information includes resource indexes of two reference signals, one piece of antenna panel state information, and two sets of channel quality information.

The resource indexes of the two reference signals are respectively the resource index RS 1 of the reference signal 1 and the resource index RS 2 of the reference signal 2.

Because measurement results corresponding to the antenna panel state information are measurement results of the antenna panel 2 and the antenna panel 3, the channel state information may include only one piece of antenna panel state information. The antenna panel state information may be a bitmap whose length is 4, and a value of the bitmap may be 0110. The four bits in the bitmap correspond to four antenna panels of the terminal device, that is, the antenna panel 1 to the antenna panel 4. A bit whose bit value is 1 indicates that a state of a corresponding antenna panel is the first state, and a bit whose bit value is 0 indicates that a state of a corresponding antenna panel is the second state. Therefore, based on the bitmap, it may be determined that the states of the antenna panel 1 and the antenna panel 4 are the second state, and the states of the antenna panel 2 and the antenna panel 3 are the first state.

The $1^{st}$ set of channel quality information in the two sets of channel quality information may include $Q_{21}$ and $Q_{31}$, that is, the channel quality information corresponding to the antenna panel 2 and the antenna panel 3, and the $2^{nd}$ set of channel quality information may include $Q_{23}$ and $Q_{33}$, that is, the channel quality information corresponding to the antenna panel 2 and the antenna panel 3. Values of $Q_{21}$, $Q_{31}$, $Q_{23}$, and $Q_{33}$ may be the same, for example, may be a least significant bit of the channel quality information.

Assuming that the channel state information is divided by using the foregoing composition manner 1, the first part of information may include the resource index (that is, RS 1) of the reference signal 1, the resource index (RS 2) of the reference signal 2, the antenna panel state information (that is, 1001), one piece of channel quality information (for example, $Q_{21}$) in the $1^{st}$ set of channel quality information, and one piece of channel quality information (for example, $Q_{23}$) in the $2^{nd}$ set of channel quality information, and the second part of information may include remaining channel quality information (for example, $Q_{31}$ and $Q_{33}$) in the two sets of channel quality information.

Optionally, in some other embodiments, the information sent by the terminal device to the network device in step 502 may not include the resource indexes of the two reference signals. In this case, the terminal device may send only the antenna panel state information and the two pieces of channel quality information to the network device, where the two pieces of channel quality information are respectively the channel quality information corresponding to the antenna panel 2 and the channel quality information corresponding to the antenna panel 3.

After receiving the channel state information, the network device may send reference signals for the antenna panel 2 and the antenna panel 3. The terminal device may continue to measure the reference signal by using the antenna panel 2 and the antenna panel 3, and feedback an antenna panel that can be used for communication.

Figure 6:
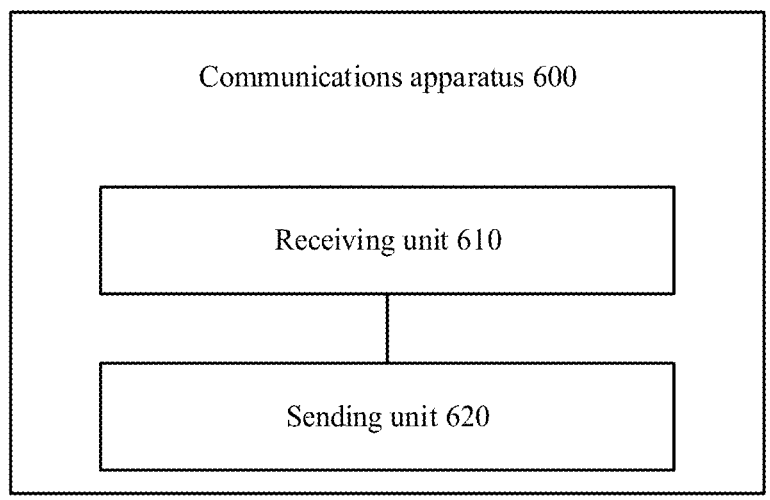
FIG. 6 is a schematic block diagram of a communications apparatus 600 according to this application.

FIG. 6 is a schematic block diagram of a communications apparatus 600 according to this application. The communications apparatus 600 may correspond to the terminal device described in the foregoing method, or may be a chip or a component used in the terminal device. In addition, modules or units in the apparatus 600 are respectively configured to perform the actions or processing processes performed by the terminal device in the foregoing method. As shown in FIG. 6, the communications apparatus 600 may include a receiving unit 610 and a sending unit 620.

The receiving unit 610 is configured to receive L reference signals, where L is a positive integer greater than or equal to 1.

The sending unit 620 is configured to send channel state information, where the channel state information includes resource indexes of M reference signals, K pieces of antenna panel state information, and M sets of channel quality information. The M reference signals belong to the L reference signals; the K pieces of antenna panel state information indicate states of antenna panels; the K pieces of antenna panel state information are related to the M sets of channel quality information; the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

Optionally, the states of the antenna panels include a first state or a second state; and the first state is a state in which transmission can be performed, and the second state is a state in which transmission cannot be performed; the first state is an active state, and the second state is an inactive state; the first state is an enabled state, and the second state is a disabled state; or the first state is a power-on state, and the second state is a power-off state.

Optionally, that the K pieces of antenna panel state information are related to the M sets of channel quality information includes: a $j^{th}$ piece of antenna panel state information in the K pieces of antenna panel state information corresponds to at least one set of channel quality information in the M sets of channel quality information, and j is an integer greater than or equal to 1 and less than or equal to K.

Optionally, the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information includes $P_j$ pieces of channel quality information, the $P_j$ pieces of channel quality information are in a one-to-one correspondence with the $P_j$ antenna panels, and i is a positive integer greater than or equal to 1 and less than or equal to M.

Optionally, one of the K pieces of antenna panel state information indicates that states of a maximum of $P_{max}$ antenna panels are the first state, and a value of $P_{max}$ is configured by the network device.

Optionally, channel quality information in the M sets of channel quality information indicates that no measurement is performed on a corresponding antenna panel, or indicates channel quality of a corresponding antenna panel that is obtained through measurement.

Optionally, one piece of channel quality information in the M sets of channel quality information indicates that no measurement is performed on a corresponding antenna panel; and in channel quality information in the M sets of channel quality information, an antenna panel corresponding to channel quality information of a preset value is not measured.

Optionally, the preset value is a minimum state value of the channel quality information.

Optionally, the channel state information includes a first part of information and a second part of information, and the first part of information and the second part of information are independently encoded; and the first part of information includes the resource indexes of the M reference signals, the K pieces of antenna panel state information, and M pieces of channel quality information, the second part of information includes channel quality information other than the channel quality information included in the first part of information in the M sets of channel quality information, and the M pieces of channel quality information respectively belong to the M sets of channel quality information; or the first part of information includes the resource indexes of the M reference signals and the K pieces of antenna panel state information, and the second part of information includes the M sets of channel quality information.

Optionally, channel quality indicated by the M sets of channel quality information is greater than or equal to a preset threshold.

For specific functions and beneficial effects of the receiving unit 610 and the sending unit 620, refer to descriptions in the foregoing method embodiments. Details are not described herein again.

Figure 7:
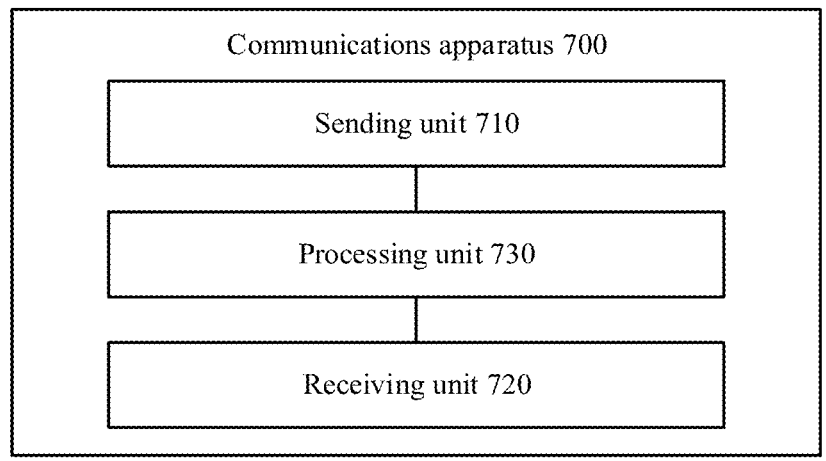
FIG. 7 is a schematic block diagram of a communications apparatus 700 according to an embodiment of this application.

FIG. 7 is a schematic block diagram of a communications apparatus 700 according to an embodiment of this application. The communications apparatus 700 may correspond to (for example, may be used in or may be) the network device described in the foregoing method. In addition, modules or units in the communications apparatus 700 are respectively configured to perform the actions or processing processes performed by the network device in the foregoing method. As shown in FIG. 7, the communications apparatus 700 may include a sending unit 710, a receiving unit 720, and a processing unit 730.

The sending unit 710 is configured to send L reference signals, where L is a positive integer greater than or equal to 1.

The receiving unit 720 is configured to receive channel state information, where the channel state information includes resource indexes of M reference signals, K pieces of antenna panel information, and M sets of channel quality information.

The processing unit 730 is configured to determine the M sets of channel quality information based on the K pieces of antenna panel information, where the M reference signals belong to the L reference signals; the K pieces of antenna panel state information indicate states of antenna panels; the K pieces of antenna panel state information are related to the M sets of channel quality information; the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

Optionally, the states of the antenna panels include a first state or a second state; and the first state is a state in which transmission can be performed, and the second state is a state in which transmission cannot be performed; the first state is an active state, and the second state is an inactive state; the first state is an enabled state, and the second state is a disabled state; or the first state is a power-on state, and the second state is a power-off state.

Optionally, that the K pieces of antenna panel state information are related to the M sets of channel quality information includes: a $j^{th}$ piece of antenna panel state information in the K pieces of antenna panel state information corresponds to at least one set of channel quality information in the M sets of channel quality information, and j is an integer greater than or equal to 1 and less than or equal to K.

Optionally, the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information includes $P_j$ pieces of channel quality information, the $P_j$ pieces of channel quality information are in a one-to-one correspondence with the $P_j$ antenna panels, and i is a positive integer greater than or equal to 1 and less than or equal to M.

Optionally, one of the K pieces of antenna panel state information indicates that states of a maximum of $P_{max}$ antenna panels are the first state, and a value of $P_{max}$ is configured by the network device.

Optionally, channel quality information in the M sets of channel quality information indicates that no measurement is performed on a corresponding antenna panel, or indicates channel quality of a corresponding antenna panel that is obtained through measurement.

Optionally, one piece of channel quality information in the M sets of channel quality information indicates that no measurement is performed on a corresponding antenna panel; and in channel quality information in the M sets of channel quality information, an antenna panel corresponding to channel quality information of a preset value is not measured.

Optionally, the preset value is a minimum state value of the channel quality information.

Optionally, the channel state information includes a first part of information and a second part of information, and the first part of information and the second part of information are independently encoded; and the first part of information includes the resource indexes of the M reference signals, the K pieces of antenna panel state information, and M pieces of channel quality information, the second part of information includes channel quality information other than the channel quality information included in the first part of information in the M sets of channel quality information, and the M pieces of channel quality information respectively belong to the M sets of channel quality information; or the first part of information includes the resource indexes of the M reference signals and the K pieces of antenna panel state information, and the second part of information includes the M sets of channel quality information.

For specific functions and beneficial effects of the sending unit 710, the receiving unit 720, and the processing unit 730, refer to descriptions in the foregoing method embodiments. Details are not described herein again.

Figure 8:
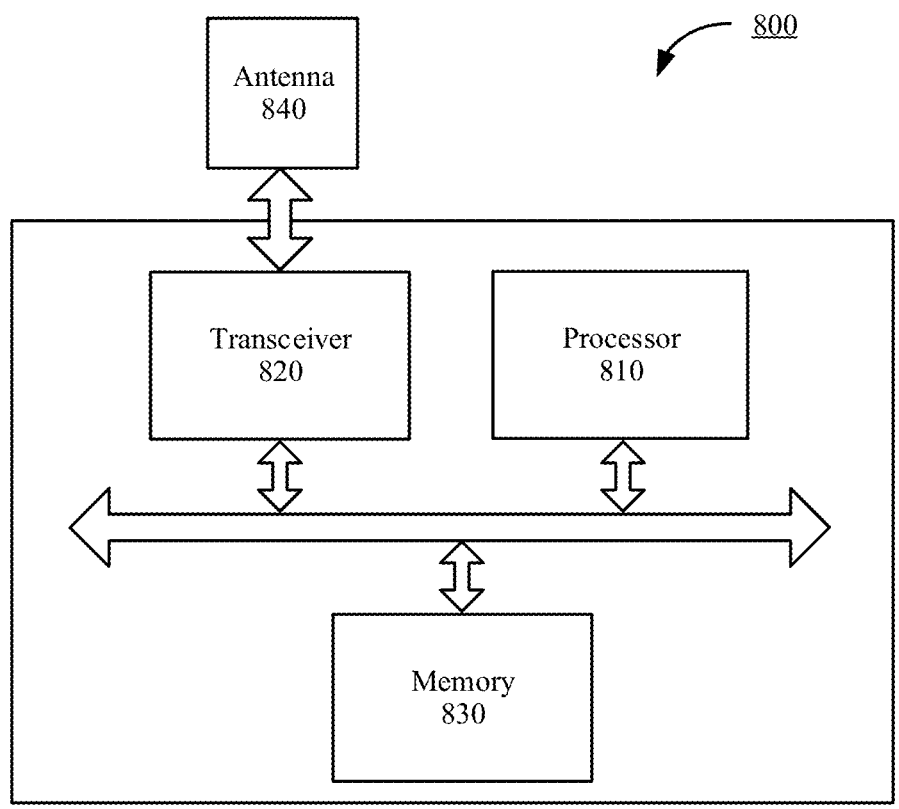
FIG. 8 is a schematic diagram of a structure of a terminal device 800 according to an embodiment of this application.

FIG. 8 is a schematic diagram of a structure of a terminal device 800 according to an embodiment of this application. As shown in FIG. 8, the terminal device 800 includes a processor 810 and a transceiver 820. Optionally, the terminal device 800 further includes a memory 830. The processor 810, the transceiver 820, and the memory 830 communicate with each other through an internal connection path, to transfer a control signal and/or a data signal. The memory 830 is configured to store a computer program. The processor 810 is configured to invoke the computer program from the memory 830 and run the computer program, to control the transceiver 820 to send and receive a signal.

The processor 810 and the memory 830 may be integrated into one processing apparatus. The processor 810 is configured to execute program code stored in the memory 830 to implement the function of the terminal device in the foregoing method embodiments. During specific implementation, the memory 830 may alternatively be integrated into the processor 810, or may be independent of the processor 810. The transceiver 820 may be implemented by using a transceiver circuit.

The terminal device may further include an antenna 840, configured to send, by using a radio signal, uplink data or uplink control signaling output by the transceiver 820, or send, after receiving downlink data or downlink control signaling, the downlink data or the downlink control signaling to the transceiver 820 for further processing.

It should be understood that, the terminal device 800 may correspond to the terminal device in the method according to the embodiments of this application, and the apparatus 800 may alternatively be a chip or a component used in the terminal device. In addition, modules in the apparatus 800 implement corresponding procedures in the foregoing method embodiments. Specifically, the memory 830 is configured to store program code, so that when the processor 810 executes the program code, the processor 810 is controlled to perform the step performed by the terminal device in the method. A specific process in which each unit performs the foregoing corresponding step has been described in detail in the method. For brevity, details are not described herein again.

Figure 9:
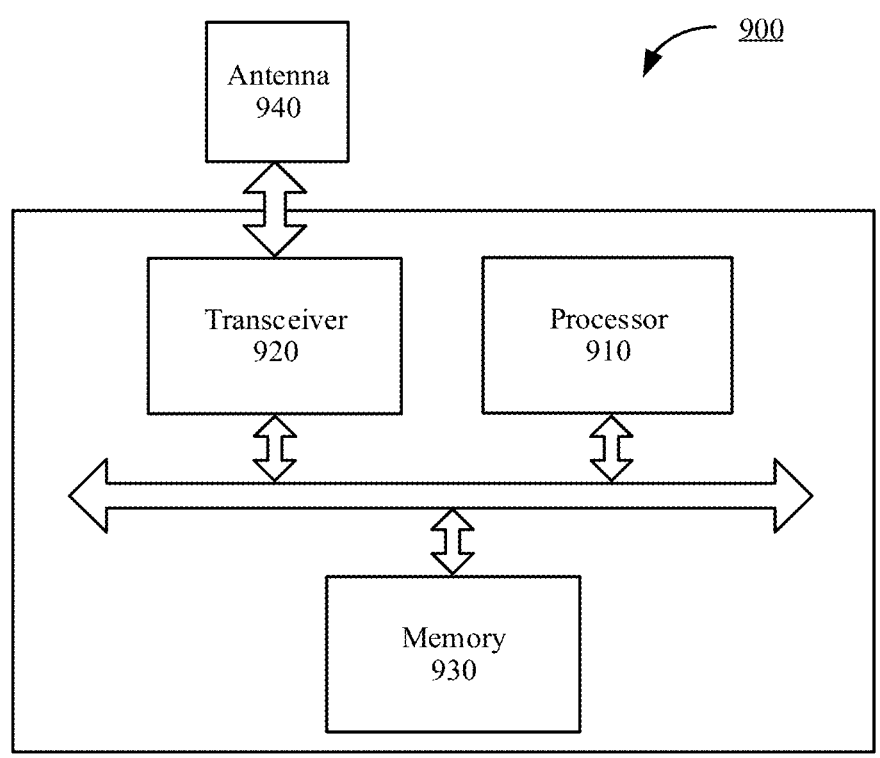
FIG. 9 is a schematic diagram of a structure of a network device 900 according to an embodiment of this application.

FIG. 9 is a schematic diagram of a structure of a network device 900 according to an embodiment of this application. As shown in FIG. 9, the network device 900 (for example, a base station) includes a processor 910 and a transceiver 920. Optionally, the network device 900 further includes a memory 930. The processor 910, the transceiver 920, and the memory 930 communicate with each other through an internal connection path, to transfer a control signal and/or a data signal. The memory 930 is configured to store a computer program. The processor 910 is configured to invoke the computer program from the memory 930 and run the computer program, to control the transceiver 920 to send and receive a signal.

The processor 910 and the memory 930 may be integrated into one processing apparatus. The processor 910 is configured to execute program code stored in the memory 930 to implement the function of the base station in the foregoing method embodiments. During specific implementation, the memory 930 may alternatively be integrated into the processor 910, or may be independent of the processor 910. The transceiver 920 may be implemented by using a transceiver circuit.

The network device may further include an antenna 940, configured to send, by using a radio signal, downlink data or downlink control signaling output by the transceiver 920, or send, after receiving uplink data or uplink control signaling, the uplink data or the uplink control signaling to the transceiver 920 for further processing.

It should be understood that, the network device 900 may correspond to the network device in the method according to the embodiments of this application, and the apparatus 900 may alternatively be a chip or a component used in the base station. In addition, modules in the apparatus 900 implement corresponding procedures in the foregoing method embodiments. Specifically, the memory 930 is configured to store program code, so that when the processor 910 executes the program code, the processor 910 is controlled to perform the step performed by the network device in the method embodiments. A specific process in which each unit performs the foregoing corresponding step has been described in detail in the method.

When the communications apparatus 600 is a chip, the chip includes a transceiver unit and a processing unit. The transceiver unit may be an input/output circuit or a communications interface. The processing unit may be a processor, a microprocessor, or an integrated circuit integrated on the chip.

When the communications apparatus 700 is a chip, the chip includes a transceiver unit and a processing unit. The transceiver unit may be an input/output circuit or a communications interface. The processing unit may be a processor, a microprocessor, or an integrated circuit integrated on the chip.

The chip in this embodiment of this application may be a field programmable gate array (field programmable gate array, FPGA), an application-specific integrated circuit (application specific integrated circuit, ASIC), a system on chip (system on chip, SoC), a central processing unit (central processor unit, CPU), a network processor (network processor, NP), a digital signal processor (digital signal processor, DSP), a microcontroller unit (micro controller unit, MCU), a programmable logic device (programmable logic device, PLD), another programmable logic device, a discrete gate or a transistor logic device, a discrete hardware component, or another integrated chip.

In an implementation process, the steps in the foregoing methods may be completed by using a hardware integrated logic circuit in the processor or instructions in a form of software. The steps in the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor. To avoid repetition, details are not described herein again.

It should be noted that, the processor in the embodiments of this application may be an integrated circuit chip, and has a signal processing capability. In an implementation process, the steps in the foregoing method embodiments may be completed by using a hardware integrated logical circuit in the processor or instructions in a form of software. The general-purpose processor may be a microprocessor, or the processor may be any conventional processor, or the like. The steps in the methods disclosed with reference to the embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these types of memories and any memory of another appropriate type.

According to the methods provided in the embodiments of this application, this application further provides a computer program product. The computer program product includes computer program code. When the computer program code is run on a computer, the computer is enabled to perform the method in any one of the embodiments shown in FIG. 2 to FIG. 5.

According to the methods provided in the embodiments of this application, this application further provides a computer-readable medium. The computer-readable medium stores program code. When the program code is run on a computer, the computer is enabled to perform the method in any one of the embodiments shown in FIG. 2 to FIG. 5.

According to the methods provided in the embodiments of this application, this application further provides a system. The system includes the foregoing one or more terminal devices and the foregoing one or more network devices.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending channel state information, wherein the method comprises:
   receiving L reference signals, wherein L is a positive integer greater than or equal to 1; and
   sending channel state information, wherein the channel state information comprises resource indexes of M reference signals, K pieces of antenna panel state information, and M sets of channel quality information, wherein:
   the M reference signals belong to the L reference signals;
   the K pieces of antenna panel state information indicate states of antenna panels;
   the K pieces of antenna panel state information are related to the M sets of channel quality information, wherein a piece of antenna panel state information in the K pieces of antenna panel state information indicates states of a plurality of antenna panels;
   the M sets of channel quality information are in a one-to-one correspondence with the resource indexes of the M reference signals; and
   M is a positive integer greater than or equal to 1 and less than or equal to L, and K is a positive integer greater than or equal to 1 and less than or equal to M.

2. The method according to claim 1, wherein the states of the antenna panels comprise a first state or a second state, wherein the first state is a state in which transmission can be performed, and the second state is a state in which transmission cannot be performed, and wherein:
   the first state is an active state, and the second state is an inactive state;
   the first state is an enabled state, and the second state is a disabled state; or
   the first state is a power-on state, and the second state is a power-off state.

3. The method according to claim 2, wherein that the K pieces of antenna panel state information are related to the M sets of channel quality information comprises:
   a $j^{th}$ piece of antenna panel state information in the K pieces of antenna panel state information corresponds to at least one set of channel quality information in the M sets of channel quality information, and j is an integer greater than or equal to 1 and less than or equal to K.

4. The method according to claim 3, wherein:
   the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and
   an $i^{th}$ set of channel quality information in the at least one set of channel quality information comprises $P_j$ pieces of channel quality information, the $P_j$ pieces of channel quality information are in a one-to-one correspondence with the $P_j$ antenna panels, and i is a positive integer greater than or equal to 1 and less than or equal to M.

5. The method according to claim 2, wherein one of the K pieces of antenna panel state information indicates that states of a maximum of $P_{max}$ antenna panels are the first state, and a value of $P_{max}$ is configured by a network device.

6. A method for sending channel state information, wherein the method comprises:
   sending L reference signals, wherein L is a positive integer greater than or equal to 1;
   receiving channel state information, wherein the channel state information comprises resource indexes of M reference signals, K pieces of antenna panel state information, and M sets of channel quality information; and
   determining the M sets of channel quality information based on the K pieces of antenna panel state information, wherein:
   the M reference signals belong to the L reference signals;
   the K pieces of antenna panel state information indicate states of antenna panels;
   the K pieces of antenna panel state information are related to the M sets of channel quality information, wherein a piece of antenna panel state information in the K pieces of antenna panel state information indicates states of a plurality of antenna panels;

the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

7. The method according to claim 6, wherein the states of the antenna panels comprise a first state or a second state, wherein the first state is a state in which transmission can be performed, and the second state is a state in which transmission cannot be performed, and wherein:

the first state is an active state, and the second state is an inactive state;
the first state is an enabled state, and the second state is a disabled state; or
the first state is a power-on state, and the second state is a power-off state.

8. The method according to claim 7, wherein that the K pieces of antenna panel state information are related to the M sets of channel quality information comprises:

a $j^{th}$ piece of antenna panel state information in the K pieces of antenna panel state information corresponds to at least one set of channel quality information in the M sets of channel quality information, and j is an integer greater than or equal to 1 and less than or equal to K.

9. The method according to claim 8, wherein:

the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information comprises $P_j$ pieces of channel quality information, the $P_j$ pieces of channel quality information are in a one-to-one correspondence with the $P_j$ antenna panels, and i is a positive integer greater than or equal to 1 and less than or equal to M.

10. The method according to claim 7, wherein one of the K pieces of antenna panel state information indicates that states of a maximum of $P_{max}$ antenna panels are the first state, and a value of $P_{max}$ is configured by a network device.

11. A communications apparatus, comprises:
one or more processors; and
a memory, wherein the memory stores a computer program, and when executing the computer program stored in the memory, the one or more processors execute operations comprising:
receiving L reference signals, wherein L is a positive integer greater than or equal to 1; and
sending channel state information, wherein the channel state information comprises resource indexes of M reference signals, K pieces of antenna panel state information, and M sets of channel quality information, wherein:
the M reference signals belong to the L reference signals;
the K pieces of antenna panel state information indicate states of antenna panels;
the K pieces of antenna panel state information are related to the M sets of channel quality information, wherein a piece of antenna panel state information in the K pieces of antenna panel state information indicates states of a plurality of antenna panels;

the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

12. The apparatus according to claim 11, wherein the states of the antenna panels comprise a first state or a second state, wherein the first state is a state in which transmission can be performed, and the second state is a state in which transmission cannot be performed, and wherein:

the first state is an active state, and the second state is an inactive state;
the first state is an enabled state, and the second state is a disabled state; or
the first state is a power-on state, and the second state is a power-off state.

13. The apparatus according to claim 12, wherein that the K pieces of antenna panel state information are related to the M sets of channel quality information comprises:

a $j^{th}$ piece of antenna panel state information in the K pieces of antenna panel state information corresponds to at least one set of channel quality information in the M sets of channel quality information, and j is an integer greater than or equal to 1 and less than or equal to K.

14. The apparatus according to claim 13, wherein:

the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information comprises $P_j$ pieces of channel quality information, the $P_j$ pieces of channel quality information are in a one-to-one correspondence with the $P_j$ antenna panels, and i is a positive integer greater than or equal to 1 and less than or equal to M.

15. The apparatus according to claim 12, wherein one of the K pieces of antenna panel state information indicates that states of a maximum of $P_{max}$ antenna panels are the first state, and a value of $P_{max}$ is configured by a network device.

16. A communications apparatus, comprises:
one or more processors; and
a memory, wherein the memory stores a computer program, and when executing the computer program stored in the memory, the one or more processors execute operations comprising:
sending L reference signals, wherein L is a positive integer greater than or equal to 1;
receiving channel state information, wherein the channel state information comprises resource indexes of M reference signals, K pieces of antenna panel state information, and M sets of channel quality information; and
determining the M sets of channel quality information based on the K pieces of antenna panel state information, wherein:
the M reference signals belong to the L reference signals;
the K pieces of antenna panel state information indicate states of antenna panels;
the K pieces of antenna panel state information are related to the M sets of channel quality information, wherein a piece of antenna panel state information in the K pieces of antenna panel state information indicates states of a plurality of antenna panels;

the M sets of channel quality information are in a one-to-one correspondence with the resource indexes of the M reference signals; and M is a positive integer greater than or equal to 1 and less than or equal to L, and K is a positive integer greater than or equal to 1 and less than or equal to M.

17. The apparatus according to claim 16, wherein the states of the antenna panels comprise a first state or a second state, wherein the first state is a state in which transmission can be performed, and the second state is a state in which transmission cannot be performed, and wherein:

the first state is an active state, and the second state is an inactive state;

the first state is an enabled state, and the second state is a disabled state; or the first state is a power-on state, and the second state is a power-off state.

18. The apparatus according to claim 17, wherein that the K pieces of antenna panel state information are related to the M sets of channel quality information comprises:

a $j^{th}$ piece of antenna panel state information in the K pieces of antenna panel state information corresponds to at least one set of channel quality information in the M sets of channel quality information, and j is an integer greater than or equal to 1 and less than or equal to K.

19. The apparatus according to claim 18, wherein:

the $j^{th}$ piece of antenna panel state information in the K pieces of antenna panel state information indicates that states of $P_j$ antenna panels in P antenna panels are the first state, P is a positive integer greater than or equal to 1, and $P_j$ is a positive integer greater than or equal to 1 and less than or equal to P; and an $i^{th}$ set of channel quality information in the at least one set of channel quality information comprises $P_j$ pieces of channel quality information, the $P_j$ pieces of channel quality information are in a one-to-one correspondence with the $P_j$ antenna panels, and i is a positive integer greater than or equal to 1 and less than or equal to M.

20. The apparatus according to claim 17, wherein one of the K pieces of antenna panel state information indicates that states of a maximum of $P_{max}$ antenna panels are the first state, and a value of $P_{max}$ is configured by a network device.

* * * * *